United States Patent
Poirel et al.

(10) Patent No.: US 11,436,512 B2
(45) Date of Patent: Sep. 6, 2022

(54) GENERATING EXTRACTED FEATURES FROM AN EVENT

(71) Applicant: Forcepoint, LLC, Austin, TX (US)

(72) Inventors: Christopher Poirel, Baltimore, MD (US); William Renner, Baltimore, MD (US); Eduardo Luiggi, Ellicott City, MD (US); Phillip Bracikowski, Indianapolis, IN (US)

(73) Assignee: Forcepoint, LLC, Austin, TX (US)

( * ) Notice: Subject to any disclaimer, the term of this patent is extended or adjusted under 35 U.S.C. 154(b) by 172 days.

(21) Appl. No.: 16/033,798

(22) Filed: Jul. 12, 2018

(65) Prior Publication Data
US 2020/0019891 A1    Jan. 16, 2020

(51) Int. Cl.
G06F 15/18    (2006.01)
G06N 7/00    (2006.01)
H04L 9/40    (2022.01)

(52) U.S. Cl.
CPC ......... *G06N 7/005* (2013.01); *H04L 63/1425* (2013.01); *H04L 63/1433* (2013.01)

(58) Field of Classification Search
CPC .... G06N 20/00; G06N 7/005; H04L 63/1425; H04L 63/1433; H04L 63/105
See application file for complete search history.

(56) References Cited

U.S. PATENT DOCUMENTS

| | | |
|---|---|---|
| 6,072,875 A | 6/2000 | Tsudik |
| 6,678,693 B1 | 1/2004 | Shiraishi |
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |

(Continued)

FOREIGN PATENT DOCUMENTS

WO    2019153581 A1    8/2019
WO    WO-2019153581 A1    8/2019

OTHER PUBLICATIONS

Mesaros et al., Latent Semantic Analysis in Sound Event Detection, 19th European Signal Processing Conference (EUSIPCO 2011), pp. 1307-1311.

(Continued)

*Primary Examiner* — Anh Nguyen
(74) *Attorney, Agent, or Firm* — Terrile, Cannatti & Chambers; Stephen A. Terrile

(57) ABSTRACT

A method, system and computer-usable medium for performing a feature generation operation. The performing a feature generation operation including: receiving a stream of events, the stream of events comprising a plurality of events; applying labels to applicable events from the plurality of events, the applying labels providing a labeled event; and, processing the labeled event to extract a feature from the labeled event, the processing providing a feature associated with an event.

20 Claims, 14 Drawing Sheets

(56) References Cited

U.S. PATENT DOCUMENTS

| | | |
|---|---|---|
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,038,178 B1* | 5/2015 | Lin .................. H04L 63/02 |
| | | 726/23 |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1* | 12/2015 | Eden .................. G06Q 10/06395 |
| | | 705/7.41 |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1* | 4/2016 | Boe .................. H04L 29/08072 |
| | | 707/601 |
| 2016/0117937 A1 | 4/2016 | Penders et al. |
| 2016/0147380 A1 | 5/2016 | Coates et al. |

(56) References Cited

U.S. PATENT DOCUMENTS

| | | |
|---|---|---|
| 2016/0164922 A1 | 6/2016 | Boss et al. |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1* | 3/2017 | Muddu ................ H04L 41/145 |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1* | 6/2017 | Koh ................ H04N 21/44008 |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | Deluca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0334025 A1 | 10/2020 | Wang et al. |

OTHER PUBLICATIONS

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-hot, edited May 22, 2018, https://en.wikipedia.org/wiki/One-hot.

Marinescu, Dan C., Cloud Computing and Computer Clouds, University of Central Florida, 2012, pp. 1-246.

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

List of Patents or Applications Treated as Related, 2018.

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Singh et al., Container-Based Microservice Architecture for Cloud Applications, International Conference on Computing, Communication and Automation (ICCCA2017), 2017.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computerand Information Technology; Ubiquitous Computing and Communications; Dependable, Automatic and Secure Computing; Persuasive Intelligence and Computing, pp. 1711-1717, Dec. 2015.

(56) References Cited

OTHER PUBLICATIONS

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

* cited by examiner

GENERATING EXTRACTED FEATURES FROM AN EVENT

BACKGROUND OF THE INVENTION

Field of the Invention

The present invention relates in general to the field of computers and similar technologies, and in particular to software utilized in this field. Still more particularly, it relates to a method, system and computer-usable medium for generating extracted features from an event.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult.

However, not all user behavior poses the same risk. For example, a user accessing an organization's proprietary resources poses a higher risk than the same user perusing an online website during working hours. Consequently, indiscriminately applying the same policy to all user behavior instead of adjusting security oversight accordingly may result in inefficient utilization of security system resources. However, identifying what may be anomalous, abnormal, unexpected, or malicious user behavior can often prove challenging, as such behavior may not be readily apparent when employing typical security monitoring approaches.

SUMMARY OF THE INVENTION

A method, system and computer-usable medium for generating extracted features from an event.

More specifically, in one embodiment the invention relates to a method for performing a feature generation operation, comprising: receiving a stream of events, the stream of events comprising a plurality of events; applying labels to applicable events from the plurality of events, the applying labels providing a labeled event; and, processing the labeled event to extract a feature from the labeled event, the processing providing a feature associated with an event.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a stream of events, the stream of events comprising a plurality of events; applying labels to applicable events from the plurality of events, the applying labels providing a labeled event; and, processing the labeled event to extract a feature from the labeled event, the processing providing a feature associated with an event.

In another embodiment, the invention relates to a non-transitory, computer-readable storage medium embodying computer program code, the computer program code comprising computer executable instructions configured for: receiving a stream of events, the stream of events comprising a plurality of events; applying labels to applicable events from the plurality of events, the applying labels providing a labeled event; and, processing the labeled event to extract a feature from the labeled event, the processing providing a feature associated with an event.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
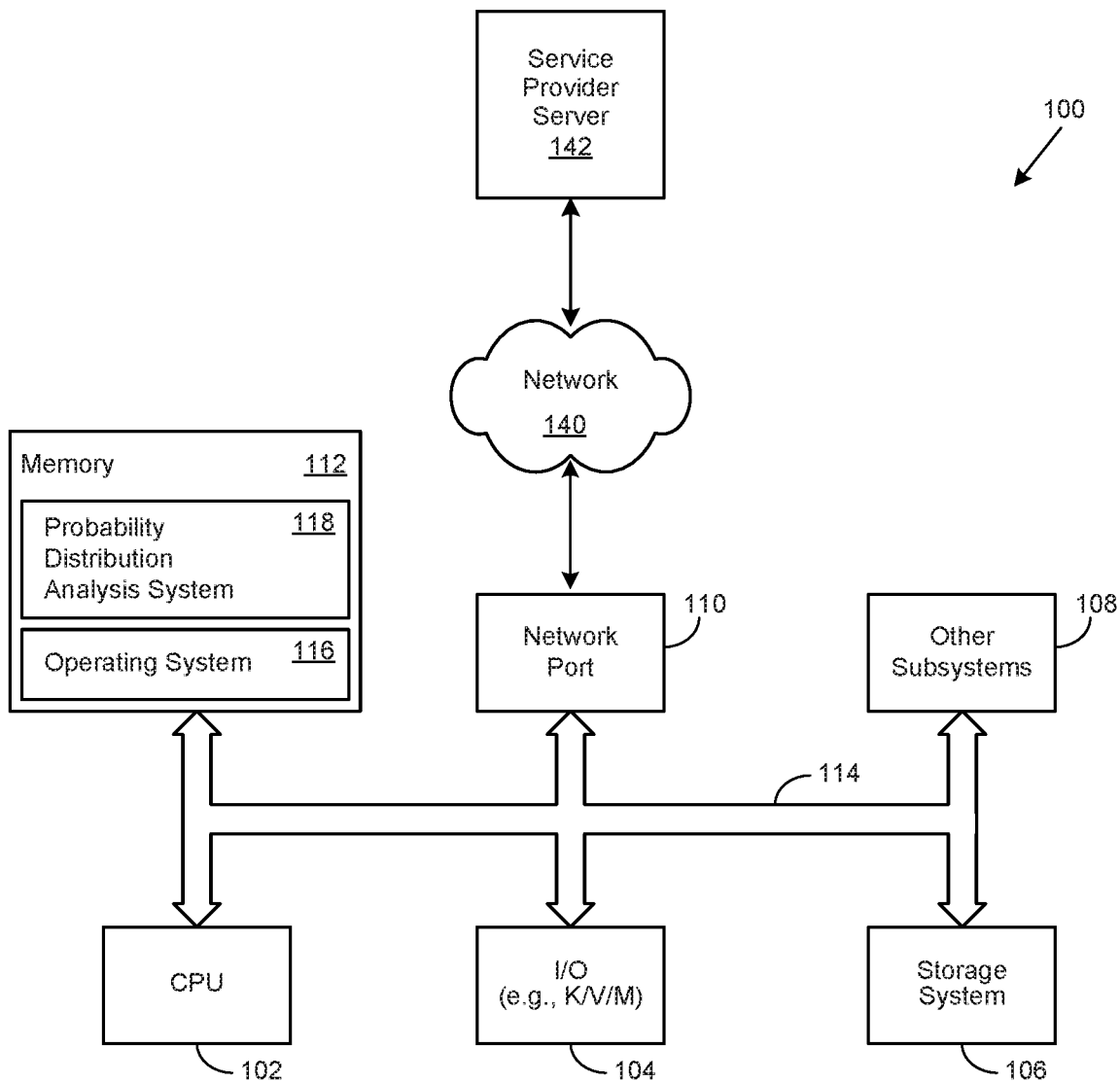
FIG. 1 depicts an exemplary client computer in which the present invention may be implemented.

A method, system and computer-usable medium for analyzing probability distributions of interrelated event features in real-time. Certain aspects of the invention reflect an appreciation that social behavior over short time scales is frequently understood in terms of actions, which can be thought of as discrete events in which one individual emits a behavior directed at one or more other entities in his or her environment, possibly including themselves. Certain aspects of the invention likewise reflect an appreciation that the analysis of such events often includes the generation of probability distributions of certain associated items of interest, described in greater detail herein. Likewise, certain aspects of the invention reflect an appreciation that such analysis is often performed in batch mode, or on-demand, as opposed to being performed in real-time in a streaming environment.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory; and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108, In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a probability distribution analysis system 118. In one embodiment, the information handling system 100 is able to download the probability distribution analysis system 118 from the service provider server 142. In another embodiment, the probability distribution analysis system 118 is provided as a service from the service provider server 142.

In various embodiments, the probability distribution analysis system 118 performs a probability distribution analysis operation. In certain embodiments, the probability distribution analysis operation improves processor efficiency, and thus the efficiency of the information handling system 100, by analyzing the probability distribution of features associated with certain interrelated events. As will be appreciated, once the information handling system 100 is configured to perform the probability distribution analysis operation, the information handling system 100 becomes a specialized computing device specifically configured to perform the probability distribution analysis operation and is not a general purpose computing device. Moreover, the implementation of the probability distribution analysis system 118 on the information handling system 100 improves the functionality of the information handling system 100 and provides a useful and concrete result of analyzing the probability distribution of features associated with certain interrelated events.

Figure 2:
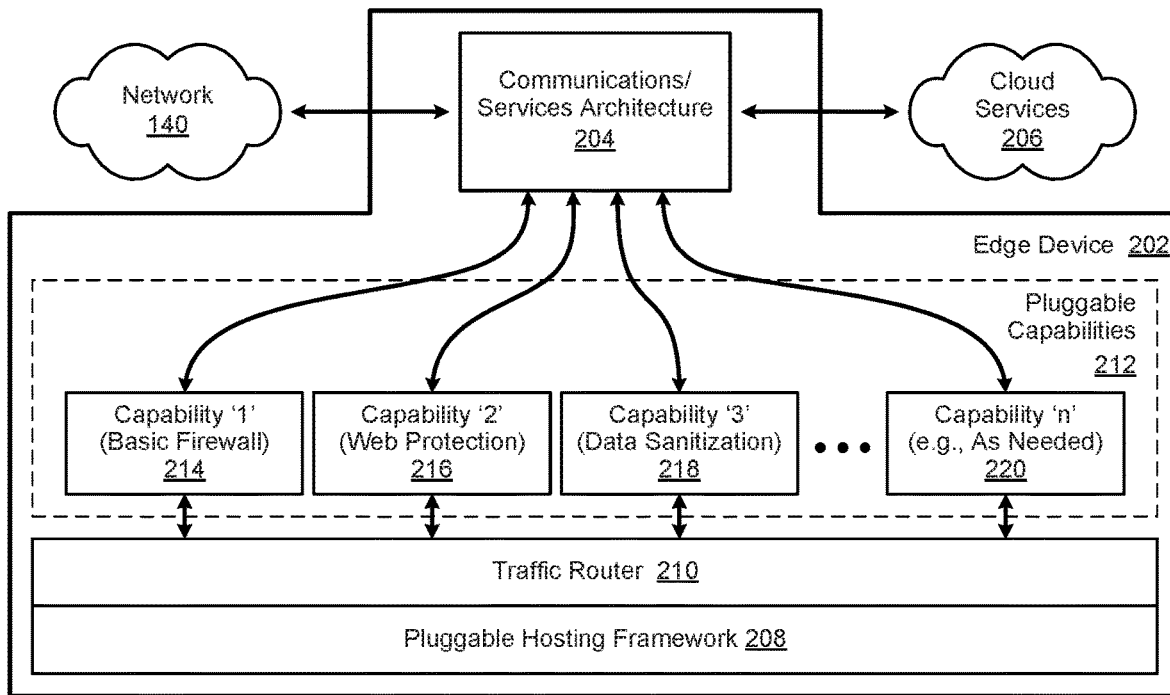
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with analyzing the probability distribution of features associated with certain interrelated events, as described in greater detail herein. In certain embodiments, such operations may include the provision of associated temporal information time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
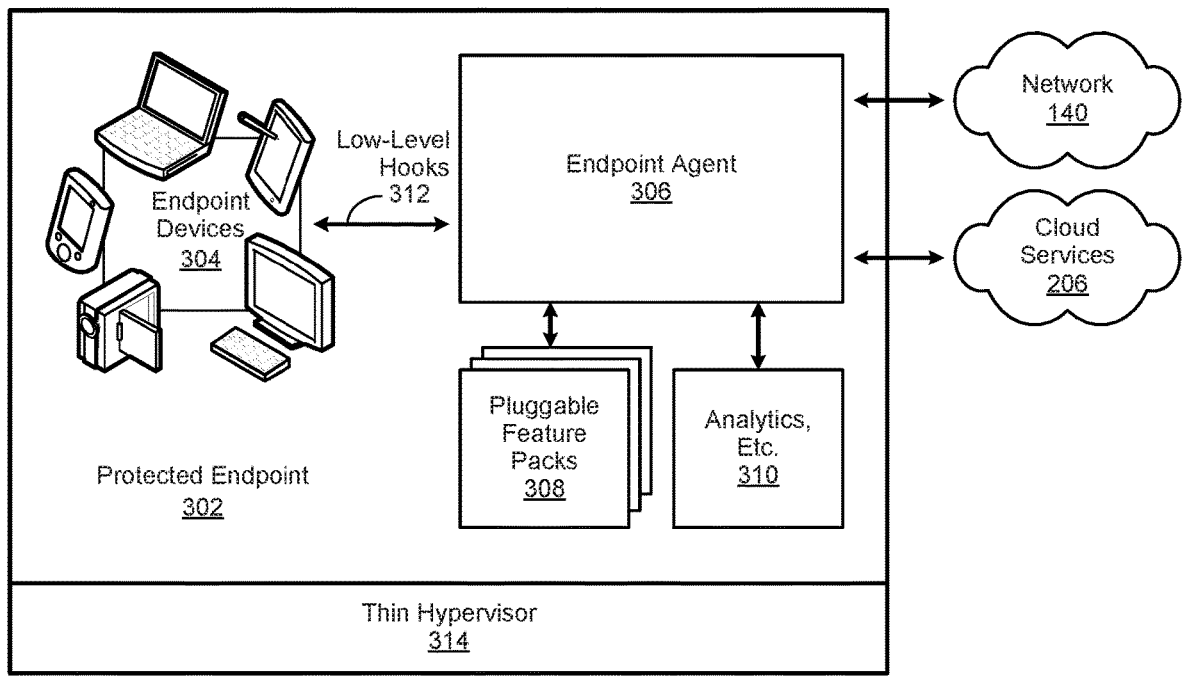
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 may be implemented to perform operations associated with analyzing the probability distribution of features associated with certain interrelated events, as described in greater detail herein. In various embodiments, the protected endpoint may be implemented to collect and provide certain information associated with an event, described in greater detail herein. In certain embodiments, the protected endpoint 302 may be implemented to provide temporal information, such as timestamp information, associated with such operations.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with analyzing probability distributions of interrelated event features in real time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 may be invoked by the endpoint agent 306 according to the occurrence of a particular user behavior. In certain embodiments, the individual features of a pluggable feature pack 308 may be invoked by the endpoint agent 306 according to the occurrence of a particular event, described in greater detail herein. In certain embodiments, the individual features of a pluggable feature pack 308 may be invoked by the endpoint agent 306 at a particular point in time. In these embodiments, the method by which a given user behavior, event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the event analytics 310 functionality may include analyzing the probability distribution of features associated with certain interrelated events, as described in greater detail herein. In certain embodiments, a particular event may in turn be associated with one or more user behaviors, likewise described in greater detail herein.

In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
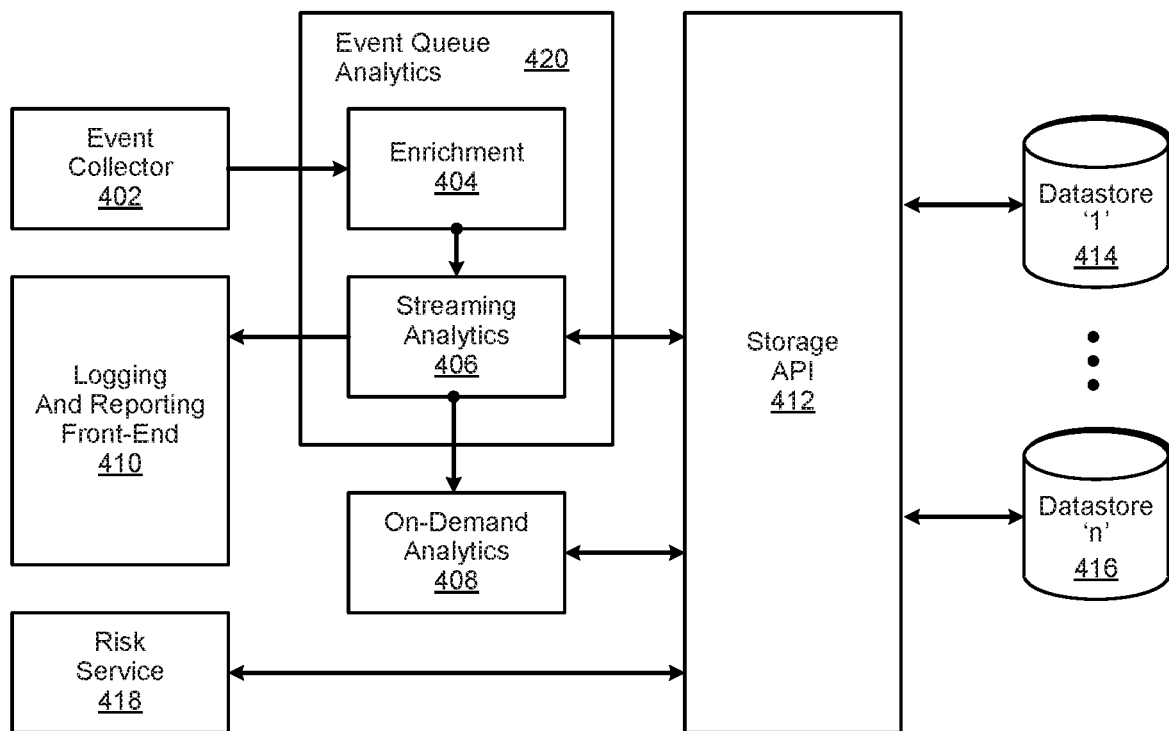
FIG. 4 is a simplified block diagram of a security analytics system.

FIG. 4 is a simplified block diagram of a security analytics system implemented in accordance with an embodiment of the invention. In certain embodiments, the security analytics system shown in FIG. 4 may be implemented to provide log storage, reporting, and analytics capable of performing streaming 406 and on-demand 408 analytics operations. In certain embodiments, such operations may be associated with defining and managing a user profile, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received. In certain embodiments, the enriched user behavior information may be associated with a particular event. In certain embodiments, the enrichment 404 and streaming analytics 406 modules may be implemented to perform event queue analytics 420 operations, as described in greater detail herein.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with defining and managing a user profile, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
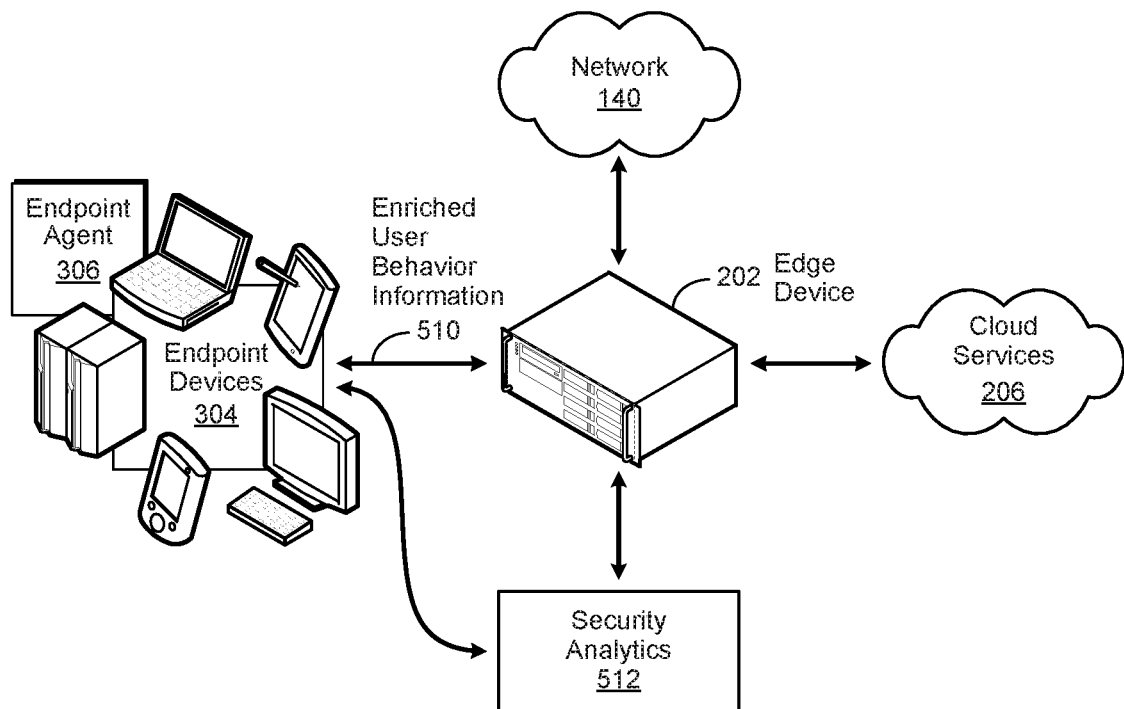
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated with analyzing the probability distribution of features associated with certain interrelated events, as described in greater detail herein. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 512 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
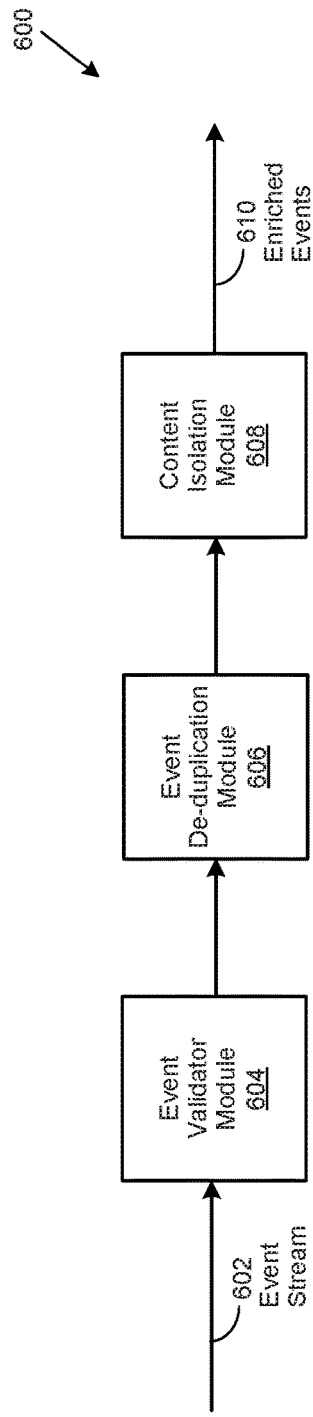
FIG. 6 is a generalized process flow diagram of the performance of event enrichment operations.

FIG. 6 is a generalized process flow diagram of the performance of event enrichment operations implemented in accordance with an embodiment of the invention. As used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To extend the example, the recipient of the email may open the infected binary file, and as a result, infect their computer with malware. To continue the example, the act of opening the infected binary file is directly associated with a user behavior enacted by the second user. However, the infection of the email recipient's computer by the infected binary file is indirectly associated with the described user behavior enacted by the second user.

As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

In certain embodiments, event stream enrichment operations 600 may be initiated by individual events in an event stream 602 being received and processed by various event enrichment modules to generate enriched events 610. As used herein, event enrichment broadly refers to performing certain data enrichment operations and processes associated with enriching data associated with a particular event in the event stream 602. As likewise used herein, data enrichment broadly refers to various operations and processes typically used to enhance, refine or otherwise improve raw data.

Examples of geographic data enrichment may include the use of postal code, county name, longitude and latitude, and political district data, while examples of behavioral data enrichment may include purchase, credit risk, and preferred communication channel data. Likewise, examples of demographic data enrichment may include the use of income, marital status, and education data, while examples of psychographic data enrichment may include interests and political affiliation data.

In certain embodiments, event enrichment may include matching certain incoming events in the event stream 602 with existing event data. In certain embodiments, event enrichment may include deleting certain data associated with certain incoming events in the event stream 602. For example, certain data associated with various incoming events may be determined to be irrelevant to analyzing the probability distributions of certain interrelated event features. In certain embodiments, the method by which data associated with various incoming events is determined to be irrelevant is a matter of design choice.

In certain embodiments, event enrichment may include correcting invalid data associated with certain incoming events in the event stream 602. In certain embodiments, event enrichment may include interpolating data associated with certain incoming events in the event stream 602 with existing event data. In certain embodiments, the existing event data may be stored in a repository of persistent event data.

For example, an event in the event stream 602 may be associated with a first user attaching a binary file to an email addressed to a second user. In this example, the event enrichment operations 600 may include determining the file type of the attachment. Likewise, the event enrichment operations 600 may include determining the size of the attachment, the date and time of the email, the address of the originating email server, the email addresses of the first and second user, and so forth. In certain embodiments, the event enrichment operations 600 may include associating annotations or other metadata corresponding to such determinations with the event.

In certain embodiments, the event enrichment modules may include an event validator module 604. In certain embodiments, the event validator 604 module may be implemented to perform data validation operations on data associated with a particular event. As used herein, data validation broadly refers to various operations and processes associated with data cleansing to ensure data quality. As likewise used herein, data cleansing broadly refers to the process of detecting, correcting, and possible removing, corrupted or inaccurate elements from a data set. In certain embodiments, data cleansing operations may include identifying incomplete, incorrect, inaccurate, or irrelevant data elements and then replacing, modifying or deleting certain data elements that fail to meet certain data use parameters.

In certain embodiments, the event validator 604 module may be implemented to perform data validation operations without the use of statistical data. In certain embodiments, the event validator 604 module may be implemented to validate event timestamps fall within a particular interval of time. In certain embodiments, the interval of time may be user-defined or otherwise configurable. In these embodiments, the definition of the interval of time is a matter of design choice. In certain embodiments, the event validator 604 module may be implemented such that an alias for an entity does not exceed a certain number of characters. In these embodiments, the number of characters is a matter of design choice. In certain embodiments, the event validator 604 module may be implemented that any attested metadata has an expected, corresponding type. In these embodiments, the expected type of metadata is a matter of design choice.

In certain embodiments, the resulting validated event data may be consistent with similar data sets used by a probability distribution analysis system to analyze the probability distribution of features associated with certain interrelated events. Certain embodiments of the invention reflect an appreciation that the intent of such data validation is to ensure fitness, accuracy and consistency of data associated with a particular event. Certain embodiments of the invention likewise reflect an appreciation that such fitness, accuracy and consistency is advantageous when performing operations associated with analyzing the probability distribution of features associated with certain interrelated events.

In certain embodiments, the event enrichment modules may include a de-duplication 606 module. In certain embodiments, the de-duplication 606 module may be implemented to perform operations associated with de-duplication. As used herein, de-duplication operations broadly refer to operations for determining a unique identity for an event based upon certain identifying fields. In certain embodiments, the identifying fields may include an externally-generated concept, idea or notion provided by the data source from which the event originated. In various embodiments, the identifying fields may include certain fields deemed to be fundamental to the identity of an event, or identification thereof. In certain embodiments, the value of an identifying field may be taken as imprecise with configurable granularity. For example, events that appear to be similar, and have timestamps within one minute of one another, may be considered duplicates.

As likewise used herein, entity resolution operations broadly refer to operations for resolving certain raw identifiers in input data to known entities. In certain embodiments, the known entities may be used by a probability distribution analysis system for analyzing probability distributions of interrelated event features. Likewise, as used herein, attachment enrichment operations broadly refer to operations for adding metadata based upon the quantity or type of data associated with an event. In certain embodiments, the metadata may be determined by extension, mime type headers, or mime type, as inferred from content associated with an event. As used herein, domain enrichment operations broadly refer to operations for adding metadata based upon configurable categorizations of domains of entity identifiers associated with the event. In certain embodiments, the metadata may be used to categorize the event as internal or external to an organization, a particular business unit, government agency, and so forth.

In certain embodiments, the event enrichment modules may likewise include a content isolation 608 module. In certain embodiments, the content isolation 608 module may be implemented to recognize and isolate certain types of recurring content. Examples of such recurring content may include standardized text, such as disclaimers or various types of boilerplate. Other examples of recurring content may include graphical images such as logos, icons, user avatars, and so forth. Certain embodiments of the invention reflect an appreciation that the inclusion of such recurring content in certain probability distribution analyses may result in an inaccurate representation of the probability distribution of features associated with a particular event. Accordingly, certain embodiments of the invention may not include content that has been isolated by the content isolation 608 module when performing various probability distribution analysis operations, described in greater detail herein.

Figure 7:
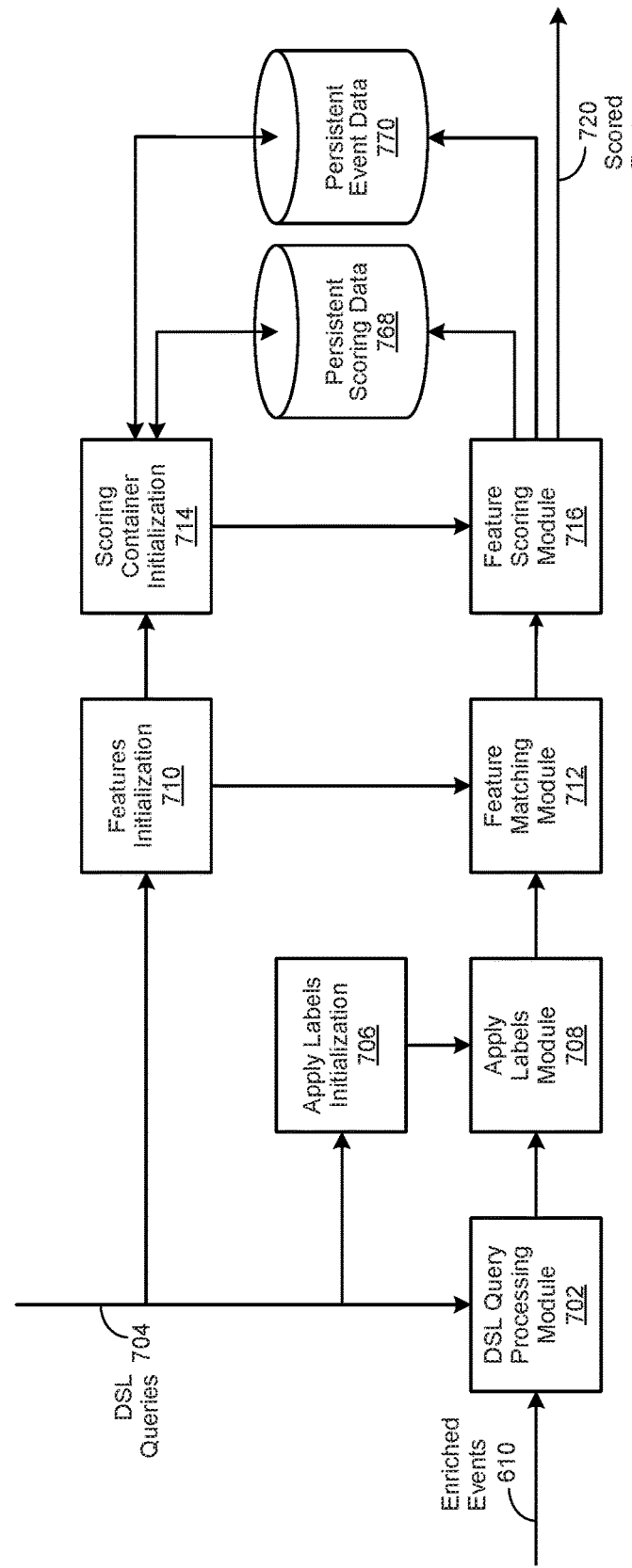
FIG. 7 is a generalized process flow diagram of the performance of event queue analytics operations.

FIG. 7 is a generalized process flow diagram of the performance of event queue analytics operations implemented in accordance with an embodiment of the invention. In various embodiments, a probability distribution analysis system may be implemented to process certain entity information associated with an event to analyze the probability distribution of its associated features. As used herein, entity information broadly refers to information that can be used to ascertain or corroborate the identity of an entity and its associated behavior, whether the behavior occurs within a physical realm or cyberspace. In certain embodiments, entity information may include user profile attributes, user behavior factors, or user mindset factors, described in greater detail herein. In various embodiments, entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the probability distribution analysis system may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the probability distribution analysis system may be implemented to use information associated with such temporal resolution of an entity's identity to assess the risk associated with a particular entity, at a particular point in time, and adaptively respond with an associated response. In certain embodiments, the probability distribution analysis system may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the probability distribution analysis system may be more oriented in various embodiments to risk adaptation than to security administration.

As used herein, a probability distribution broadly refers to a mathematical function that provides the probabilities of occurrence of different possible outcomes within a sample space. In certain embodiments, the probability distribution is defined by a probability distribution function. In certain embodiments, the probability distribution function may be implemented as a probability density function, a probability mass function, or a cumulative distribution function. A sample space, as likewise used herein, broadly refers to the set of all possible outcomes of a particular phenomenon being observed. In certain embodiments, the phenomenon being observed may be an event, described in greater detail herein. In certain embodiments, the phenomenon being observed is a matter of design choice.

As likewise used herein, a probability density function (PDF), or density of a continuous random variable, broadly refers to a function whose value at any given sample within a particular sample space can be interpreted as providing a relative likelihood that the value of the random variable would equal that sample. A probability mass function (PMF), as used herein, broadly refers to a function that gives the probability that a discrete random variable is exactly equal to a particular value. A cumulative distribution function (CDF), as likewise used herein, broadly refers to a function whose value is the probability that a corresponding continuous random variable, described in greater detail herein, has a value less than or equal to the argument of the function.

In certain embodiments, one or more probability distribution functions may be implemented to describe the distribution of multivariate random variables. In certain embodiments, one or more probability distribution functions may be implemented to determine the relative unlikelihood that the value of a random variable would equal a particular sample. In certain embodiments, the relative unlikelihood that the value of a random variable would equal a particular sample may be classified as an outlier. In certain embodiments, the method by which a particular sample may be classified as an outlier is a matter of design choice. As an example, a particular sample that is more than two standard deviations from the mean of a PDF distribution may be considered to be an outlier. Likewise, a particular sample that is more than one standard deviation from the mean of a PDF distribution may be considered to be an outlier.

In certain embodiments, the sample may be the occurrence of a feature associated with a corresponding event. As used herein, a feature, as it relates to an event, broadly refers to a property, characteristic or attribute of a particular event. As an example, features associated with a corpus of thousands of text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits.

In certain embodiments, such features may be associated with anomalous, abnormal, unexpected or malicious user behavior, as described in greater detail herein. In certain embodiments, the occurrence of an unlikely feature or features associated with a particular entity may result in the generation of a corresponding risk score. In certain embodiments, the generation of a corresponding risk score may include computing the aggregation of occurrences of certain unlikely features with which an entity may be associated. In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In certain embodiments, the event queue analytics operations may be implemented to determine whether or not a particular document matches a set of queries 704 defined in a Domain Specific Language (DSL). In certain embodiments, the DSL query 704 may reference data, metadata, or a combination thereof, related to an event. In certain embodiments, the DSL query 704 may be expressed in a DSL specific to the domain of temporal events involving the data, metadata, or a combination related to such events. As used herein, a document broadly refers to a body of content. In certain embodiments, such content may include text, unstructured data, structured data, graphical images, photographs, audio recordings, video recordings, biometric information, metadata, and so forth. As likewise used herein, a Domain Specific Language (DSL) broadly refers to a computer language specialized to a particular application domain. Examples of DSLs include Hypertext Mark-up Language (HTML) for web pages. Mathematica® for symbolic mathematics, Structured Query Language (SQL) for relational database queries, and Query DSL (QDSL) for Elasticsearch queries.

Referring now to FIG. 7, enriched events 610 resulting from performance of the event enrichment operations 600 described in the text associated with FIG. 6 may be provided in certain embodiments to a DSL query processing 702 module. In certain embodiments, the DSL query processing 702 module may be implemented to provide a streaming query framework. In certain embodiments, the streaming query framework may be implemented to extract features, as described in greater detail herein, and construct probability distributions in real-time, in batch mode, or on-demand. In certain embodiments, the DSL query processing 702 module may be implemented to receive certain DSL queries 704 that include terms, features, tags, or other items of interest that may be associated with certain interrelated events. As used herein, a term broadly refers to a word, compound word, phrase expression, numeric value, or alphanumeric string, which in certain contexts is associated with a particular meaning. As used herein, a phrase broadly refers to a sequence of terms, or multi-words, familiar to skilled practitioners of the art. In certain embodiments, a term may be associated with an event, a feature of an event, a classification label, a metadata tag label, or a combination thereof.

In certain embodiments, the DSL query processing 702 module may be implemented to determine the commonalties between such DSL queries 704. In certain embodiments, the DSL query processing 702 module may be implemented to lazily evaluate such features, terms, or phrases of interest, as described in greater detail herein. In certain embodiments, as likewise described in greater detail herein, the DSL query processing 702 module may be implemented only evaluate the features or other terms of interest needed for the evaluation of a particular event. In certain embodiments, the DSL query processing 702 module may be implemented to only evaluate the features or other terms of interest once when performing multiple queries.

In certain embodiments, the queries may only be processed when the DSL query processing 702 module is first initialized. In certain embodiments the queries 704 may be reprocessed periodically by the DSL query processing 702 module during event collection if they have been added to or otherwise changed. In certain embodiments, such reprocessing may be performed by periodically polling for configuration changes and reinitializing the DSL query processing 702 module as needed. Certain embodiments of the invention reflect an appreciation that such reinitializing of the DSL query processing 702 module facilitates the reduction of a DSL query 704, which involves executing preliminary query steps against reference data. In certain embodiments, the reference data may be stored in a secondary repository (not shown), which cross-references the event data using identifiers searchable within a repository of persistent event data 770.

As an example, a DSL query 704 may be for events associated with employees whose salary is greater than some amount. In this example, the first step is to identify who those employees may be, and once they are identified, include them into the query when it is "reduced." It will be appreciated that the use of cached results in place of taking this step may result in missing an employee who recently received a raise, and as a result, belongs in the group of identified employees. It will likewise be appreciated that inclusion in the group of identified employees would typically not occur until the DSL query processing 702 module was reinitialized. In certain embodiments, the DSL query processing 702 module may be implemented to periodically recompile and re-reduce certain DSL queries 704. In these embodiments, the method by which the decision is made to periodically recompile and re-reduce DSL queries 704 is a matter of design choice.

In certain embodiments, the receipt of a DSL query 704 may result in certain apply labels initialization 706 operations being performed to initialize an apply labels 708 module. In certain embodiments, the apply labels 708 module may be implemented to classify events received from the DSL query processing 702 module by labeling them with associated classification labels. In certain embodiments, the labels applied by the apply labels 708 module may include associated metadata tags. In these embodiments, the method by which the apply labels 708 module selects a classification or metadata tag label, and the associated nomenclature thereof, is a matter of design choice.

As an example, an event may include a user downloading a file from a particular server address. In this example, the event may be classified as a "file download" with corresponding metadata of "server address." Accordingly, the apply labels 614 module may apply both a "file download" classification label and a "server address" metadata tag label to the event. As another example, an event may include an employee using a badge to enter a secured facility after normal work hours. In this example, the event may be classified as "facility access," with corresponding metadata of "secure" and "after hours." Accordingly, the apply labels 708 module may apply a "facility access" classification label as well as "secure" and "after hours" metadata tag labels to the event.

In certain embodiments, the labels applied by the apply labels 708 module may be user-generated, user-edited, or a combination thereof. In various embodiments, certain labels applied by the apply labels 708 module may be applied automatically, corresponding to certain sets of conditions. In certain embodiments, the labels applied by the apply labels 708 module may be automatically or manually removed from certain interrelated events, based on inspection. In certain embodiments, the labels applied by the apply labels 708 module to one event may automatically or manually be added to another event. In certain embodiments, such addition of labels may be based upon a query to provide bulk labeling of certain interrelated events that may share common features or other characteristics. In various embodiments, such addition of labels may be implemented to flag certain interrelated events as part of a review workflow. In certain embodiments, the apply labels operations performed by the apply labels 708 module may result in configured features. In certain embodiments, the receipt of a DSL query 704 may result in certain features initialization 710 operations being performed to initialize a feature matching 712 module. In certain embodiments, labeled events generated by the apply labels 708 module may be processed by the feature matching 712 module to generate matched features.

In certain embodiments, the feature matching 712 module may be implemented to perform certain feature extraction operations on the configured featured generated by the apply labels 708 module.

As likewise used herein, feature extraction broadly refers to the selection of a subset of features associated with an event. In certain embodiments, the feature matching 712 module may be implemented to perform transformation operations on a group of features associated with an event to generate a smaller set of derived features. In certain embodiments, the feature matching 714 module may be implemented to construct derived probabilistic models based upon a particular group of features. In certain embodiments, certain features may be aggregated, from which the derived probabilistic models may be constructed. In certain embodiments, the resulting derived probabilistic models may be aggregated into a scenario. As used herein, a scenario is broadly defined as a group of derived probabilistic models associated with a corresponding group of interrelated events.

Certain embodiments of the invention reflect an appreciation that the generation of derived features may be advantageous as various features associated with a particular event may represent a non-linear pattern or relationship. Likewise, having too many features that may share similar attributes may result in multicollinearity or otherwise confound certain statistical models. Accordingly, the performance of certain feature extraction operations to extract a minimal number of derived features may result in more accurately determining the probability distribution of associated features corresponding to a particular event. In certain embodiments, the feature matching 712 module may be implemented to use certain scoring data stored in a repository of persistent scoring data 768, or event data stored in a repository of persistent event data 770, or a combination thereof, to perform the feature extraction operations.

In certain embodiments, scoring container update operations, described in greater detail herein, may be initiated by the performance of certain scoring container initialization 714 operations to initialize a feature scoring 716 module. In certain embodiments, the scoring container initialization 714 operations may be initiated by the performance of certain features initialization 710 operations. In certain embodiments, the scoring container initialization 712 module may be implemented to determine whether feature matching operations, likewise described in greater detail herein, should be performed on a particular configured feature.

In certain embodiments, the determination of whether or not feature matching operations are performed may be dependent upon on the type of the feature. In certain embodiments, the type of the feature may be determined by an associated feature definition. In these embodiments, the method by which a feature definition is defined, determined, or associated with a corresponding feature is a matter of design choice.

In certain embodiments, events are not inspected prior to initializing the scoring container. In certain embodiments, a repository of persistent event data 770 may be queried for a random sampling of events containing particular configured features. In certain embodiments, the resulting random sampling of events may be used during various scoring container initialization 714 operations to generate an initial probability distribution of their associated features. In certain embodiments, the initial probability distribution of associated features may likewise be stored in the repository of persistent event data 770 for re-use.

If so, then feature matching operations, described in greater detail herein, are performed on the extracted feature by a feature matching 712 module. If not, or once the feature matching operations are performed by the feature matching 712 module, scoring operations, likewise described in greater detail herein, are performed on the configured feature by a feature scoring 716 module. In certain embodiments, performance of certain feature scoring operations by the feature scoring 706 module results in the generation of scored features 720. In certain embodiments, the scored features may be stored in the repository of persistent event data 770.

Figure 8:
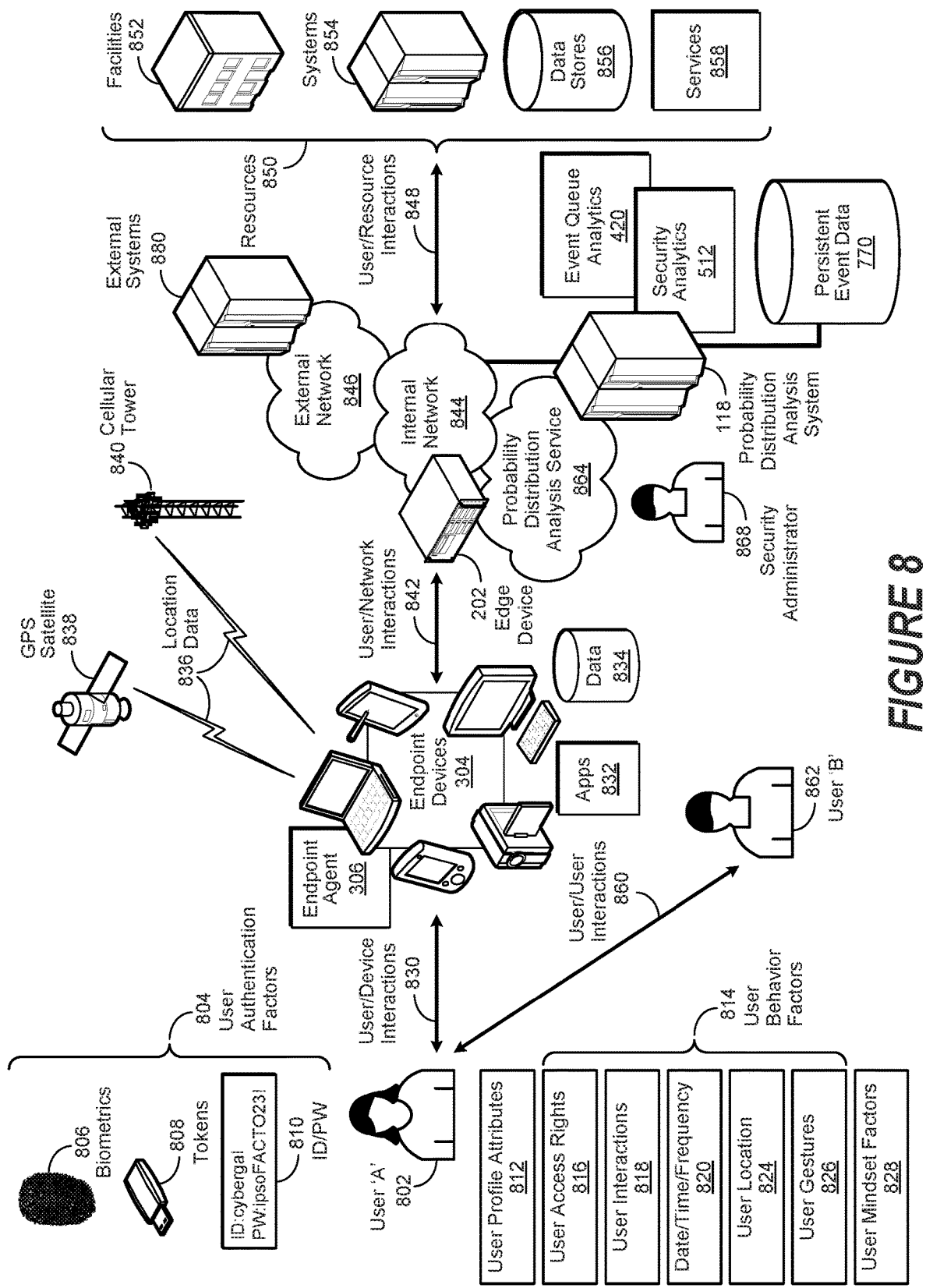
FIG. 8 is a simplified block diagram of the operation of a probability distribution analysis system.

FIG. 8 is a simplified block diagram of the operation of a probability distribution analysis system implemented in accordance with an embodiment of the invention. In certain embodiments, the probability distribution analysis system 118 may be implemented to analyze the probability distribution of features associated with certain interrelated events. In certain embodiments, such events may be associated with a user, such as user 'A' 802 or 'B' 862. In certain embodiments, analyses performed by the probability distribution analysis system 118 may be used to identify anomalous, abnormal, unexpected or malicious behavior associated with a user. In certain embodiments, the anomalous, abnormal, unexpected or malicious behavior may be identified at a particular point in time, during the occurrence of an event, the enactment of a user behavior, or a combination thereof.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, as described in greater detail herein, the user profile may include user profile attributes 812, user behavior factors 814, user mindset factors 828, or a combination thereof.

As used herein, a user profile attribute 812 broadly refers to data or metadata that can be used, individually or in combination with other user profile attributes 812, to uniquely ascertain the identity of a user. In certain embodiments, the user profile attributes 812 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSI) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 804, such as biometrics 806, tokens 808, user identifiers and passwords 810, and personal identification numbers (PINs).

In certain embodiments, the user authentication factors 804 may be used to authenticate the identity of a user, such as user 'A' 802 or 'B' 862. In certain embodiments, the user authentication factors 806 may be used to ensure that a particular user, such as user 'A' 802 or 'B' 862, is associated with their corresponding user profile, rather than a user profile associated with another user. In certain embodiments, the user authentication factors 804 may include a user's biometrics 806, an associated security token 808, (e.g., a dongle containing cryptographic keys), or a user identifier/password (ID/PW) 810.

In certain embodiments, the user authentication factors 804 may be used in combination to perform multi-factor authentication of a user, such as user 'A' 802 or 'B' 862. As used herein, multi-factor authentication broadly refers to approaches requiring two or more authentication factors. In general, multi-factor authentication includes three classes of user authentication factors 804. The first is something the user knows, such as a user ID/PW 810. The second is something the user possesses, such as a security token 808. The third is something that is inherent to the user, such as a biometric 806.

In certain embodiments, multi-factor authentication may be extended to include a fourth class of factors, which includes one or more user behavior factors 814, or portions thereof. In these embodiments, the fourth class of factors may include user behavior the user has previously enacted, is currently enacting, or is expected to enact at some point in the future. In certain embodiments, the enactment of a user behavior may be associated with a particular event. In certain embodiments, multi-factor authentication may be performed on recurring basis. In various embodiments, the multi-factor authentication may be performed at certain time intervals during the enactment of a particular user behavior. In certain embodiments, the time interval may be uniform in certain embodiments, the time interval may vary or be random.

In certain embodiments, the multi-factor authentication may be performed according to the occurrence of an event or the enactment of a particular user behavior, such as accessing a resource 850. In various embodiments, certain combinations of the multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user and their corresponding user profile.

Those of skill in the art will be aware that it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as an external system 880. Defenses against such approaches include encrypting the data stream prior to its communication across a network, such as the internal 844 or external 846 networks shown in FIG. 8.

However, other approaches, such as the use of a key logger, may surreptitiously capture the user's keystrokes or user gestures 826, described in greater detail herein, and communicate the resulting data stream in their native form to a hacker or other infiltrator. Another issue is the possibility that a normally-trusted insider, such as a security administrator 868, may have access to a decrypted data stream as part of their day-to-day responsibilities. As an example, a security administrator 868 may be using a security analytics 512 system to perform threat analysis related to a particular user. In the process, they may be exposed to various SPI associated with the user, such as certain user IDs and passwords 810. It will be appreciated that such exposure creates the opportunity for a security breach, whether intended or not. Another approach is to impersonate a legitimate website. In such approaches, the user may navigate to the site and innocently enter their ID/password 810, only to have them captured for later use in illegal activities.

As used herein, a user behavior factor 814 broadly refers to information associated with a user's behavior, whether the behavior occurs within a physical realm or cyberspace. In certain embodiments, user behavior factors 814 may include the user's access rights 816, the user's interactions 818, and the date/time/frequency 820 of when the interactions 818 are enacted. In certain embodiments, the user behavior factors 814 may likewise include the user's location 824, and the gestures 826 used to enact the interactions 818.

In certain embodiments, the user gestures 826 may include key strokes on a keypad, a cursor movement, a mouse movement or click, a finger swipe, tap, or other hand gesture, an eye movement, or some combination thereof. In certain embodiments, the user gestures 826 may likewise include the cadence of the user's keystrokes, the motion, force and duration of a hand or finger gesture, the rapidity and direction of various eye movements, or some combination thereof. In certain embodiments, the user gestures 826 may include various audio or verbal commands performed by the user.

In various embodiments, certain date/time/frequency 820 behavior factors 814 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 812, user behavior factors 814, user mindset factors 828, or a combination thereof, to one or more instants in time. As an example, user 'A' 802 may access a system 854 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 862 at 3:49 PM that same day. Furthermore, there is no record in their user behavior profile that user 'A' 802 has ever communicated with user 'B' 862 in the past. Moreover, it may be determined that user 'B' 862 is employed by a competitor. Accordingly, the correlation of user 'A' 802 downloading the customer list at one point in time, and then forwarding the customer list to user 'B' 862 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 862, user 'A' 802 leaves for a two week vacation. Upon their return, they forward the previously-downloaded customer list to user 'B' 862 at 9:14 AM on Nov. 20, 2017. From an ontological time perspective, it has been two weeks since user 'A' 802 accessed a system 854 to download the customer list. However, from a societal time perspective, they have still forwarded the customer list to user 'B' 862, despite two weeks having elapsed since the customer list was originally downloaded.

Accordingly, the correlation of user 'A' 802 downloading the customer list at one point in time, and then forwarding the customer list to user 'B' 862 at a much later point in time, is another example of societal time. More particularly, it may be inferred that the intent of user 'A' 802 did not changed during the two weeks they were on vacation. Furthermore, user 'A' 802 may have attempted to mask an intended malicious act by letting some period of time elapse between the time they originally downloaded the customer list and when they eventually forwarded it to user 'B' 862. From the foregoing, those of skill in the art will recognize that the use of societal time may be advantageous in determining whether a particular user behavior is acceptable, anomalous, abnormal, unexpected or malicious.

As used herein, mindset factors 828 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 828 may include a personality type. Examples of known approaches for determining a personality type 624 include Jungian types, Myers-Briggs type indicators, Keirsy Temperament Sorter, Socionics, Enneagram of Personality, and Eyseneck's three-factor model.

In certain embodiments, the mindset factors 828 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

Certain embodiments of the invention reflect an appreciation that certain user behavior factors 814, such as user gestures 826, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user gestures 826 may indicate the mental state of a user, they may not provide the reason for the user to be in a particular mental state. Likewise, certain embodiments of the invention include an appreciation that certain user gestures 826 and behavioral biometrics are reflective of a user's personality type. As an example, aggressive, forceful keystrokes combined with an increased heart rate may indicate normal behavior for a particular user when composing end-of-month performance reviews. In various embodiments, certain user behavior factors 814, such as user gestures 826, may be correlated with certain contextual information.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal 844 or external 846 network, capable of supporting communication between two or more entities. In certain embodiments, the entity may be a user, an endpoint device 304, or various resources, described in greater detail herein. In certain embodiments, the entities may include various endpoint devices 304 or resources 850 operating at the behest of an entity, such as a user. In certain embodiments, the communication between the entities may include audio, image, video, text, or binary data.

In certain embodiments, the contextual information may include a user's authentication factors 804. In certain embodiments, contextual information may likewise include various user identity resolution factors, such as personal information associated with the user, the date/time/frequency 820 of various user behavior, the user's location 824, the user's role or position in an organization, their associated access rights 816, and certain user gestures 826 employed by the user in the enactment of a user behavior. Other contextual information may likewise include various user interactions, whether the interactions are with an endpoint device 304, a network 140, a resource 850, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis. In certain embodiments, the user behavior analysis may be performed by the security analytics system 512. In certain embodiments, the security analytics system 512 may be implemented to process a user profile and certain correlated contextual information associated with a user to determine their mental state at a particular point in time. In certain embodiments, the mental state of a user at a particular point in time may be used in combination with various user profile attributes 812 and user behavior factors 814, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 802, will be uniquely different and distinct from another user, such as user 'B' 862. Accordingly, user profile '1' will uniquely reflect the user behavior of user '1', just as user profile 'n' will uniquely reflect the user behavior of user 'n'. As an example, user 'A' 802 may have a user profile attribute 812 of sales administrator. Upon arriving at their office in the morning, the user consistently checks their email, item by item, responding to each in turn, followed by processing expense reports for field sales personnel. Then, after lunch, the user may access and review sales forecasts on an internal system 854. Furthermore, the user may exhibit sporadic keyboard entry interspersed with extensive mouse activity, or user gestures 826, when perusing the sales forecasts.

Moreover, personality type information associated with user 'A' 802 may indicate the user consistently exhibits a positive, outgoing attitude. In this example, the sequence of the activities enacted by user 'A' 802 throughout the day, and their frequency, correspond to their expected date/time/frequency 820 user behavior factors 814. Likewise, the keyboard cadence and other user gestures 826 are examples of granular user behavior factors 814, while the personality type information is an example of an abstract user behavior factor 814.

As another example, user 'B' 862 may have a user profile attribute 812 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 854. Additionally, user 'B' 862 may exhibit deliberate keyboard entry interspersed with iterative mouse activity, or user gestures 826, when updating financial information. Moreover, personality type information associated with user 'B' 862 may indicate they consistently exhibit a reserved, introspective and contemplative attitude. As in the prior example, the sequence of the activities enacted by user 'B' 862 throughout the day, and their frequency, correspond to their expected date/time/frequency 820 user behavior factors 814. Likewise, as before, the keyboard cadence and other user gestures 826 are examples of granular user behavior factors 814, while the personality type information is an example of an abstract user behavior factor 814.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 850 in the first month in the position, but by the sixth month, such access and interaction is commonplace and routine.

In certain embodiments, a user behavior factor 814 associated with a particular user, such as user 'A' 802 or 'B' 862, may be used by the probability distribution analysis system 118 to compare the user's current user behavior to past user behavior. If the user's current user behavior matches their past user behavior, then the probability distribution analysis system 118 may determine that the user's user behavior is acceptable. If not, then the user profile management system 118 may determine that the user's user behavior is anomalous, abnormal, unexpected or malicious.

However, as described in greater detail herein, a change in a particular user's user behavior over time may not be anomalous, abnormal, unexpected, or malicious. Instead, it may be acceptable behavior that simply evolves over time as a natural result of day-to-day user/device 830, user/network 842, user/resource 848, or user/user 860 interactions. In certain embodiments, the probability distribution analysis system 118 may be implemented to determine whether such changes in a user's user behavior over time are acceptable, anomalous, abnormal, unexpected or malicious. In certain embodiments, a user behavior profile may be implemented in combination with the probability distribution analysis system 118 to make this temporal determination.

It will be appreciated that anomalous, abnormal, unexpected or malicious user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

Likewise, the probability distribution analysis system 118 may determine that the user's user behavior to be malicious. As yet another example, an impostor may be attempting to pose as a legitimate user in an attempt to exploit one or more resources 850. In this example, the attempt to exploit one or more resources 850 is malicious user behavior. As yet still another example, a legitimate user may be attempting to increase their level of access to one or more resources 850. In this example, the user's attempt to increase their level of access may indicate malicious user behavior.

To further extend these examples, such resources 850 may include various facilities 852, systems 854, data stores 856, or services 858. In certain embodiments, the probability distribution analysis system 118 may be implemented to block a user if it is determined their user behavior is anomalous, abnormal, unexpected or malicious. In certain embodiments, the probability distribution analysis system 118 may be implemented to modify a request submitted by a user if it is determined the request is anomalous, abnormal, unexpected or malicious. In certain embodiments, the probability distribution analysis system 118 may be implemented to modify an outcome. For example, the probability distribution analysis system 118 may encrypt a file when a copy operation or request is detected.

In certain embodiments, the user profile may be implemented as a cyberprofile. A cyberprofile, as used herein, broadly refers to a collection of information that uniquely describes an entity and their associated behavior within cyberspace. In certain embodiments, the probability distribution analysis system 118 may be implemented to use information associated with certain user behavior elements to define and manage a user profile. A user behavior element, as used herein, broadly refers to a discrete element of a user's behavior during the performance of a particular operation, or the occurrence of a particular event, in a physical realm, cyberspace, or a combination thereof. In certain embodiments, such user behavior elements may be associated with a user/device 830, a user/network 842, a user/resource 848, a user/user 860 interaction, or combination thereof.

As an example, user 'A' 802 may use an endpoint device 304 to browse a particular web page on a news site on the Internet. In this example, the individual actions performed by user 'A' 802 to access the web page are user behavior elements that constitute a user behavior. As another example, user 'A' 802 may use an endpoint device 304 to download a data file from a particular system 854. In this example, the individual actions performed by user 'A' 802 to download the data file, including the use of one or more user authentication factors 804 for user authentication, are user behavior elements that constitute a user behavior. In certain embodiments, the user/device 830 interactions may include an interaction between a user, such as user 'A' 802 or 'B' 862, and an endpoint device 304.

In certain embodiments, the user/device 830 interaction may include interaction with an endpoint device 304 that is not connected to a network at the time the interaction occurs. As an example, user 'A' 802 or 'B' 862 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 848 interactions may include interactions with various resources 850. In certain embodiments, the resources 850 may include various facilities 852 and systems 854, either of which may be physical or virtual, as well as data stores 856 and services 858. In certain embodiments, the user/user 860 interactions may include interactions between two or more users, such as user 'A' 802 and 'B' 862. In certain embodiments, the user/user interactions 860 may be physical, such as a face-to-face meeting, via a user/device 830 interaction, a user/network 842 interaction, a user/resource 848 interaction, or some combination thereof.

In certain embodiments, the user/user 860 interaction may include a face-to-face verbal exchange between two users. In certain embodiments, the user/user 860 interaction may include a written exchange, such as text written on a sheet of paper, between two users. In certain embodiments, the user/user 860 interaction may include a face-to-face exchange of gestures, such as a sign language exchange, between two users. In certain embodiments, temporal event information associated with various interactions 830, 842, 848, 860 may be collected and used to define and manage a user profile.

In certain embodiments, the probability distribution analysis system 118 may be implemented to observe user behavior at one or more points of observation within a physical domain or cyberspace environment. In certain embodiments, the points of observation may occur during various user interactions, such as user/device 830, user/network 842, user/resource 848, and user/user 860 interactions described in greater detail herein. As an example, a user/user 860 interaction may include an interaction between user 'A' 802 and 'B' 862.

In certain embodiments, the point of observation may include cyber behavior of various kinds within an internal 844 network. As an example, the cyber behavior within an internal 844 network may include a user accessing a particular internal system 854 or data store 856. In certain embodiments, the point of observation may include cyber behavior of various kinds within an external 846 network. As an example, the cyber behavior within an external 846 network may include a user's social media activities or participation in certain user forums. Those of skill in the art will recognize that many such examples of user/device 830, user/network 842, user/resource 848, and user/user 860 interactions are possible. Accordingly, the foregoing is not intended to limit the spirit, scope or intent of the invention.

In certain embodiments, the probability distribution analysis system 118 may be implemented to process certain contextual information to ascertain the identity of an entity at a particular point in time. In certain embodiments, the contextual information may include location data 836. In certain embodiments, the endpoint device 304 may be configured to receive such location data 836, which is used as a data source for determining the user's location 824.

In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 852 or system 854. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the probability distribution analysis system 118 may be implemented as a stand-alone system. In certain embodiments, the probability distribution analysis system 118 may be implemented as a distributed system. In certain embodiment, the probability distribution analysis system 118 may be implemented as a virtual system, such as an instantiation of one or more virtual machines (VMs). In certain embodiments, the probability distribution analysis system 118 may be implemented to use various event data stored in a repository of persistent event data 770 to perform certain probability distribution analyses, described in greater detail herein.

In certain embodiments, the probability distribution analysis system 118 may be implemented to perform event queue analytics 420 operations, likewise described in greater detail herein. In certain embodiments, the probability distribution analysis system 118 may be implemented as a probability distribution analysis service 864. In certain embodiments, the probability distribution analysis service 864 may be implemented in a cloud environment familiar to those of skill in the art. Those of skill in the art will recognize that many such embodiments are possible. Accordingly, the foregoing is not intended to limit the spirit, scope or intent of the invention.

Figure 9:
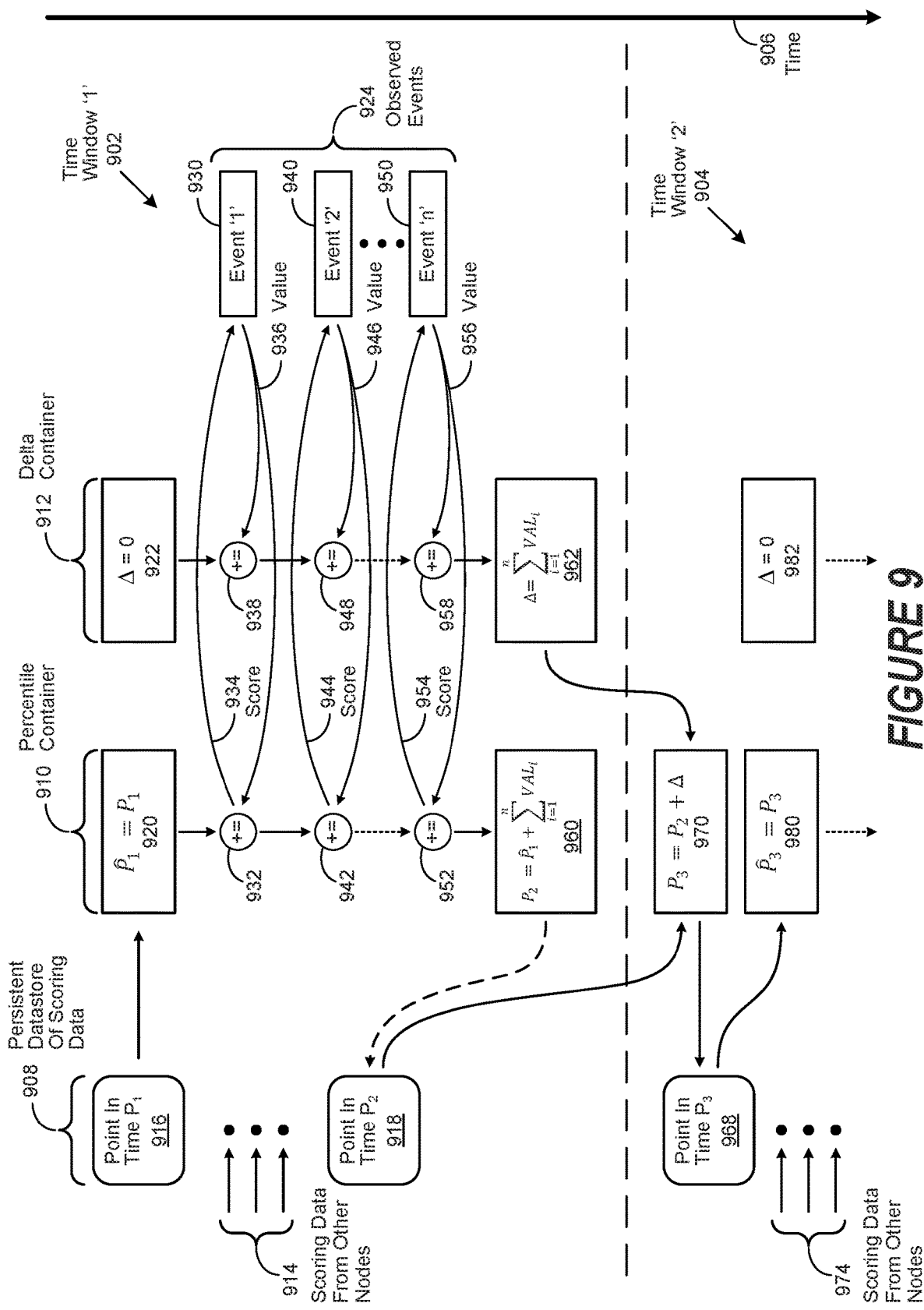
FIG. 9 is a generalized process flow diagram of the performance of scoring container update operations.

FIG. 9 is a generalized process flow diagram of the performance of scoring container update operations implemented in accordance with an embodiment of the invention. Skilled practitioners of the art will be familiar with the concept of containers, which in typical use are a class, a data structure, or an abstract data class whose instances are a collection of other objects. As such, they are used to store objects in an organized way according to certain access rules. In typical implementations, the size of a particular container is dependent upon the number of objects, or elements, it may contain.

As used herein, a scoring container broadly refers to a container implemented to provide an approximation of a probability distribution over the values it contains, based upon samples from that probability distribution. In certain embodiments, a scoring container may be implemented as a percentile 910 container, a delta 912 container, or a combination thereof. As used herein, a percentile 910 container broadly refers to a container used to collect probability distributions of features extracted from certain interrelated events over a particular period of time 906, which are in turn used to perform scoring operations, as described in greater detail herein. In certain embodiments, the extracted features may include an identifier corresponding to the definition of the feature, an extracted value associated with the feature, a score derived from an extracted value associated with the feature, or a combination thereof. As likewise used herein, a delta. 912 container broadly refers to a container used to collect probability distributions of features associated with certain interrelated events over a particular period of time 906, which are in turn used to update a persistent datastore of event data, described in greater detail herein. In certain embodiments, the objects collected and stored in a scoring container may include features associated with an event, as described in greater detail herein.

In certain embodiments, scoring container update operations may include the creation of an empty scoring container, the insertion of values, described in greater detail herein, into the scoring container, and deletion of values from the scoring container. In various embodiments, scoring container update operations may likewise include the deletion of all values in a scoring container, accessing certain values in the scoring container, and accessing the number of values in the scoring container. Likewise, scoring container update operations in certain embodiments may include operations associated with providing an approximation of a probability distribution of the values it contains.

In certain embodiments, the scoring container update operations may be implemented to perform construction and maintenance of probability distributions corresponding to certain features associated with an observed event 924, or class of Observed events 924, occurring during a particular interval of time 906. In certain embodiments, the construction and maintenance of probability distributions may be performed in real-time, batch mode, or on-demand. In certain embodiments, the resulting probability distributions may be processed by a probability distribution analysis system, described in greater detail herein, to determine the statistical likelihood of those observed events 924 occurring, wherein the likelihoods are driven by empirical data. In certain embodiments, one or more streaming scoring operations may be implemented to determine the probability distributions as the observations of events 924 are made in real-time, in batch mode, or on-demand.

In certain embodiments, multiple instances of a streaming scoring operation may be run for a node cluster to analyze the same event dataset, thereby providing horizontal scalability. As used herein, a node cluster, or cluster of nodes, broadly refers to a set of nodes organized such that each event 924 observed by a probability distribution analysis system, described in greater detail herein, is associated with, and processed by, an individual, corresponding node. In certain embodiments, horizontal scalability may be achieved by merging multiple probability distributions, as described in greater detail herein, into a single probability distribution.

In these embodiments, each node in a cluster maintains its own probability distribution and periodically accesses a persistent datastore of scoring data 908 to provide its new observations of events 924 to a global probability distribution, or pull changes from a global probability distribution of scoring data that has been added by other nodes 914, 974. As used herein, a persistent datastore of scoring data 908 broadly refers to a repository of information implemented to be collaboratively referenced by a cluster of nodes in the performance of their associated scoring container update operations. In various embodiments, scoring data from other nodes 914, 974, or associated with observed events 924, may be added to the persistent datastore of scoring data 908 at certain points in time $P_1$ 916, $P_2$ 918, $P_3$ 968, and so forth during a particular period of time 906. Consequently, all nodes within a cluster will have eventually-consistent observed data probability distributions. Accordingly, certain embodiments of the invention reflect an appreciation that the persistent datastore of scoring data 908 can serve as a "consistent, global source of truth" when analyzing the probability distribution of interrelated event features in real-time, batch mode, or on-demand.

In certain embodiments, the persistent datastore of event data may be implemented as a relational database management system (RDBMS), a structured query language (SQL) RDBMS, a not only SQL (NoSQL) database, a graph database, or other database approaches familiar to those of skill in the art. In certain embodiments, the persistent datastore of event data may be implemented to maintain distributed concurrency control. As used herein, concurrency control broadly refers to various approaches known to skilled practitioners of the art to ensure correct results for concurrent operations are generated. Certain embodiments of the invention reflect an appreciation that when certain system processes are operating concurrently, they may interact by messaging or sharing accessed data, whether in memory or in storage. Consequently, the consistency of one process may be violated, or compromised, by the operation of another.

As likewise used herein, distributed concurrency control broadly refers to the concurrency control of a system, such as the probability distribution analysis system described in greater detail herein, distributed over a computer network. In certain embodiments, distributed concurrency control may be implemented as row versioning, which skilled practitioners of the art will likewise recognize as a known form of optimistic concurrency control. Likewise, as used herein, optimistic concurrency control (OCC) broadly refers to a various concurrency control approaches applied to transactional systems, such as an RDBMS or software transactional memories. Certain embodiments of the invention reflect an appreciation that OCC optimistically assumes multiple transactions can frequently complete, with some degree of certainty, without interfering with one another.

In certain embodiments, the probability distribution associated with a particular scoring container may be implemented as a continuous probability distribution, a Boolean probability distribution, a one-hot probability distribution, or combination thereof. As used herein, a continuous probability distribution broadly refers to a probability distribution that has a probability distribution function that is continuous. In certain embodiments, the continuous probability distribution may be generated by an associated probability density function. As likewise used herein, a probability density function (PDF), or density of a continuous random variable, broadly refers to a function, the integral of which over any particular range within the sample space is equal to the relative likelihood that the value of the random value would fall within that range. In certain embodiments, a continuous probability distribution may be represented by a cumulative distribution function, which for a particular sample value indicates the unlikelihood of a value being extreme, or more extreme than that value.

Likewise, as used herein, a continuous random variable broadly refers to a variable that can take any real values, in a range which may or may not be bounded. As a result, the variable is continuous within that interval. Accordingly, a continuous random variable may have a continuous range of values, individual values being stored using a fixed-point, floating-point, or fractional representation. As an example, the cost of a transaction in some particular currency may be any value greater than or equal to zero and with no conceptual upper bound, which may be fractional with respect to the designated currency.

In certain embodiments, the continuous probability distribution may be implemented as a numeric value probability distribution. As used herein, a numeric value probability distribution broadly refers to a continuous probability distribution where the value of a variable is referenced as a numerical value. As an example, a military pilot's height may be required to be between 64 and 77 inches tall when standing, 34 to 40 inches tall when sitting, and weigh between 160 and 231 pounds, depending upon their height. In this example, the two real values respectively, establishing each physical measurement interval are 64 to 77 inches standing, 34 to 40 inches tall sitting, and weighing 160 to 231 pounds. Accordingly, a pilot that is 69 inches tall standing, 37 inches sitting, and weighs 170 pounds would be described by numeric values that are respectively continuous within each physical measurement interval.

In certain embodiments, various t-Digest approaches may be used to implement the continuous probability distribution for a scoring container. Those of skill in the art will be familiar with t-Digest, which is a probabilistic data structure for estimating percentiles for either distributed data or a stream of data. In general, the t-Digest data structure is a sparse representation of a cumulative distribution function (CDF). In typical implementations, t-Digest data structure ingests data, from which it learns "interesting" points, called centroids, within the ingested data. In certain embodiments, the centroids may indicate where the CDF is changing most quickly within a stream of ingested data. In certain embodiments, the centroids may indicate where the percentiles, may be changing most quickly. In certain embodiments, the centroids may indicate where mass is concentrated within the PDF.

Certain embodiments of the invention reflect an appreciation that such centroids may provide an indication of a potential security threat. As an example, a user may be attempting to download a series of large customer data files. In this example, typical user behavior may indicate that the user rarely, if ever, downloads such files. Instead, they may simply interact with various systems on an ad-hoc or intermittent basis, submitting queries and receiving responses. Consequently, the centroids representing the size of the large customer files the user may be attempting to download, from a percentile perspective, may indicate abnormal behavior, which may in turn represent malicious intent.

As likewise used herein, a Boolean probability distribution broadly refers to a probability distribution that takes on one of two values: true or false. Skilled practitioners of the art will be aware that since a Boolean probability distribution takes on only one of two values, it is a discrete probability distribution instead of continual. Consequently, it does not have a corresponding probability density function. Instead, it has a probability mass function. As an example, a true condition may be represented as '1' and a false condition may be represented as '0'. Accordingly, if 57 out of 100 samples have corresponding true condition, then the resulting probability mass function would have a value of '0.57'.

Likewise, as used herein, a one-hot probability distribution broadly refers to a probability distribution of a group of bits, among which the legal combinations of values are only those with a single high ("1") bit and all the others are low ("0"). To continue a previous example, a particular vehicle may be available in seven different colors, ranging from white to black. Other colors may include yellow, blue, green, red and grey. In this example, a random sample of twenty vehicles may be selected, where none of the selected vehicles was yellow. Accordingly, a one-hot probability distribution would result in the colors white, black, blue, green, red and grey having a single high ("1") bit value and the yellow vehicle having a low ("0") bit value.

Referring now to FIG. 9, the beginning of time window '1' 902 within a period of time 906 is defined by point in time P1 916 and its end is defined by point in time P2 918. Likewise, the beginning of time window '2' 904 is defined by point in time P3 968. In certain embodiments, the percentile 910 container may be implemented to be initialized at point in time $P_1$ 916 by receiving its initial contents from the persistent datastore of scoring data 908. In certain embodiments, the initial values of the percentile 910 container are set at point in time $P_1$ 916 by performing a percentile container initialization 920 operation, as follows:

$$\hat{P}_1 = P_1$$

In certain embodiments, a delta 912 initialization operation 922 may likewise be performed in certain embodiments to set the initial values of the delta 912 container to 0 at point in time $P_1$ 916.

Scoring container update operations are then initiated by the observance of event '1' 930, whose associated features are counted and represented by their corresponding values 936. These values are then respectively added 932, 938 to both the percentile 910 and delta 912 containers. The contents of the percentile 910 container are then used to perform scoring operations 960, as follows:

$$\hat{P}_2 = \hat{P}_1 + \sum_{i=1}^{n} VAL_i$$

which result in the generation of a score 934, which in turn is associated with event '1' 930. In certain embodiments, the score 934 may be implemented to represent the unlikelihood of the occurrence of a particular feature associated with event '1' 930. In certain embodiments, the score may be used by a probability distribution analysis system to generate a risk score. In certain embodiments, the risk score may be implemented to reflect possible anomalous, abnormal, unexpected or malicious behavior by an entity, as described in greater detail herein.

As events '2' 940 through 'n' 950 are observed during time window '1' 902, the values 946 through 956 of their corresponding features are then iteratively added 942 through 948, and 952 through 958, to the percentile 910 and delta 912 containers. Likewise, the contents of the percentile 910 container are iteratively used to perform scoring operations 960, which result in scores 944 through 954 being iteratively associated with events '2' 940 through 'n' 950. As previously described, the resulting scores 944 through 954 may be implemented in certain embodiments to represent the unlikelihood of the occurrence of a particular feature associated with events '2' 940 through 'n' 950.

At point in time $P_2$ 918, which defines the end of time window '1' 902, scoring operations 960 are once again performed on the contents of the percentile 910 container to produce a probability distribution of features associated with the observed events 924. In certain embodiments, the scoring operations 960 may be implemented to generate a composite score associated with events '1' 930 through 'n' 950. In certain embodiments, scores 934 through 954 may be implemented to represent the unlikelihood of the occurrence of a particular feature, or a group of features, associated with events '1' 930 through 'n' 950.

In certain embodiments, the composite score may be used by a probability distribution analysis system in certain embodiments to generate a composite risk score associated with events '1' 930 through 'n' 950. In certain embodiments, the composite risk score may be implemented to reflect possible anomalous, abnormal, unexpected or malicious behavior by an entity, or entities, during time window '1' 902, as described in greater detail herein. As an example, events '1' 930 through 'n' 950 may be associated with the user behavior of a particular entity during time window '1' 902. Likewise, an individual event of events 1' 930 through 'n' 950 may be associated with the user behavior of multiple entities during time window '1' 902. Accordingly, the composite score in certain embodiments may be implemented to represent a composite risk score associated with the entity during time window '1' 902.

Likewise, delta container summation 962 operations are iteratively performed on the contents of the delta 912 container during time window '1' 902, as follows, to show changes in the probability distribution of features as each observed event 924 occurs:

$$\Delta = \sum_{i=1}^{n} VAL_i$$

During time window '1' 902, scoring data from other nodes 914 is iteratively received by, and added to, the persistent datastore of scoring data 908. The contents of the persistent datastore of scoring data 908 at point in time $P_2$ 918 are then added to the sum 970 of the scoring operations shown in block 960 and the results of the delta operations shown in block 962 at the end of time window '1' 902, as follows:

$$P_3 = \hat{P}_2 + \Delta$$

The resulting values are then used to perform scoring data update 970 operations to update the contents of the persistent datastore of scoring data 908 at point in time $P_3$ 968. In turn, the updated values stored in the persistent datastore of scoring data 908 at point in time $P_3$ 968 are used to perform percentile container initialization 980 operations to initialize the percentile 910 container for time window '2' 904, as follows:

$\hat{P}_3 = P_3$

Likewise, delta container initialization 982 operations are performed to set the initial values of the delta 912 container to 0 at point in time $P_3$ 968 in time window '2' 904, same as for point in time $P_1$ 916 in time window '1' 902, The operations performed for time window '1' 902 are then repeated for time window '2' 904.

Figure 10:
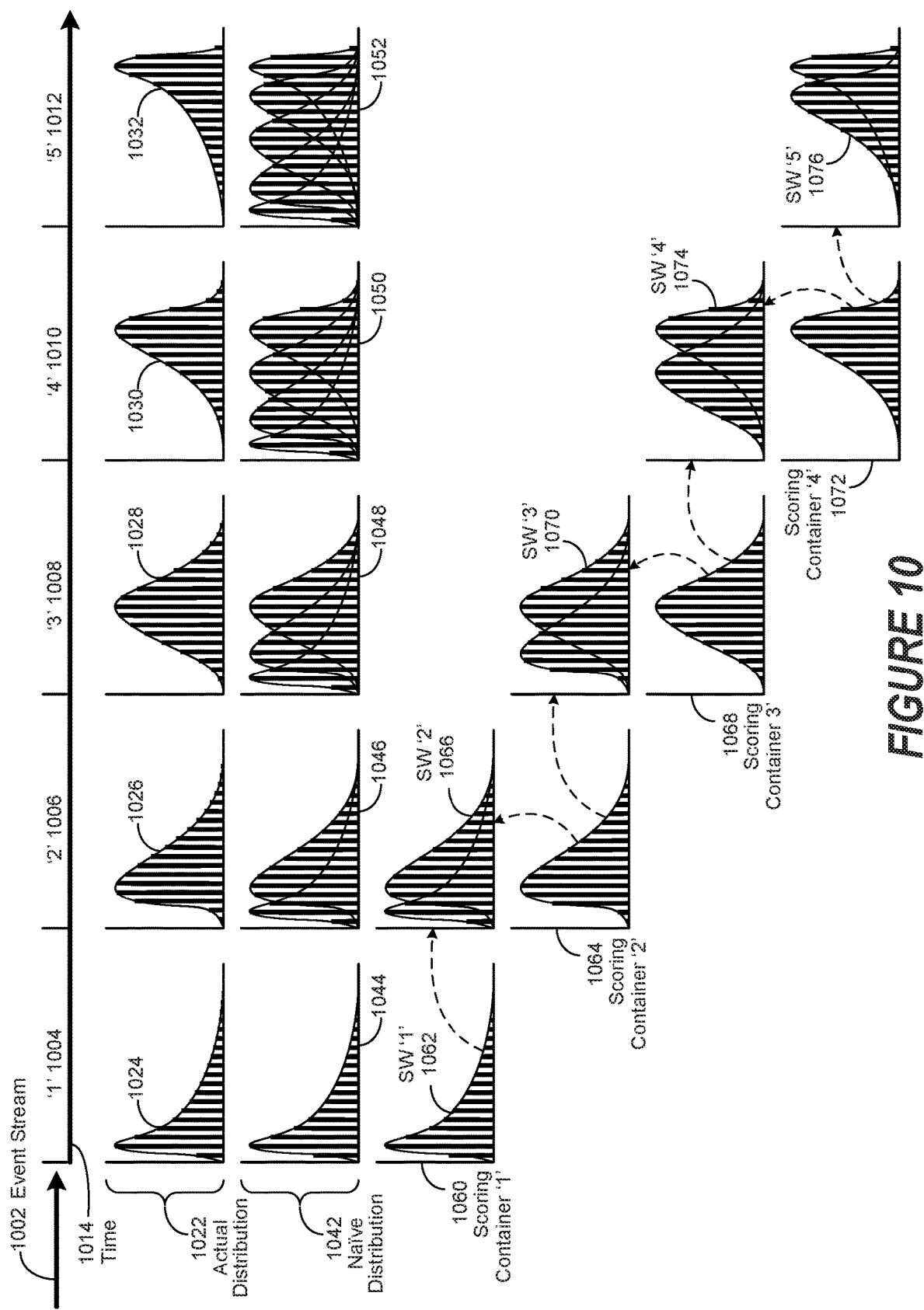
FIG. 10 shows the probability density function (PDF) distribution of certain features over a series of time windows.

FIG. 10 shows the probability density function (PDF) distribution of certain features over a series of time windows implemented in accordance with an embodiment of the invention. In certain embodiments, an event stream 1002 containing interrelated event features may be captured over a particular period of time 1014. In certain embodiments, the event stream 1002 may be processed, as described in greater detail herein, to generate extracted features, which in turn are processed to determine their associated probability distributions. In certain embodiments, the event stream 1002 may be processed by a probability distribution analysis system in real-time, batch mode, or on-demand.

In certain embodiments, the extracted features may be processed to determine their associated probability distributions for a sequence of time windows, such as time windows '1' 1004, '2 1006, '3' 1008, '4' 1010, and '5' 1012 within a particular period of time 1014. In certain embodiments, the sequence of time windows '1' 1004 through '5' 1012 may be contiguous to one another. As an example, time windows '1' 1004, '2' 1006, '3' 1008, '4' 1010, and '5' 1012 may respectively correspond to hours 1:00 PM through 6:00 PM of the same day. In certain embodiments, the sequence of time windows '1' 1004, '2 1006, '3' 1008, '4' 1010, and '5' 1012 may not be contiguous to one another. For example, time windows '1' 1004, '2 1006, '3' 1008, '4' 1010, and '5' 1012 may respectively correspond to a 24 hour period of time occurring on Wednesdays of sequential weeks.

In certain embodiments, a series of actual 1022 PDF distributions 1024, 1026, 1028, 1030, and 1032, respectively corresponding to the occurrence of certain features associated with a set of interrelated events, are collected for time windows '1' 1004, '2 1006, '3' 1008, '4' 1010, and '5' 1012 occurring within a particular period of time 1014. As an example, the interrelation of the events may be a result of each of the events being associated with the user behavior of a particular user during the time windows '1' 1004, through '5' 1012. However, as shown in FIG. 10, a naïve 1042 PDF distribution 1044, 1046, 1048, 1050, and 1052 of these interrelated event features over time windows '1' 1004 through '5' 1012 would likely result in a blurring of non-stationary modes of the distribution. As used herein, a naïve 1042 distribution broadly refers to a distribution in which a single scoring container, described in greater detail herein, is used to iteratively accrue samples across all involved time windows, such as the time windows '1' 1004 through '5' 1012.

Various embodiments of the invention reflect an appreciation that certain interrelated event features may correspond to indicators of a potential security threat. Certain embodiments of the invention likewise reflect an appreciation that a blurring of non-stationary modes of the PDF distribution of interrelated event features over a given period of time 1002 may make it challenging to identify which features are associated with which threats. Accordingly, PDF distributions of interrelated event features are respectively generated in various embodiments for certain time windows, such as time windows '1' 1004 through '5' 1012.

However, various embodiments of the invention likewise reflect an appreciation that individual PDF distributions of interrelated event features within time windows '1' 1004 through '5' 1012 may likewise fail to indicate certain trends. As an example, certain features may begin to occur more frequently over various time windows '1' 1004 through '5' 1012. Accordingly, the PDF distributions of interrelated event features corresponding to two or more sequential time windows may be combined in certain embodiments to provide a combined PDF probability distribution. In certain embodiments, two or more combined PDF probability distributions may be implemented to provide a staggered window PDF probability distribution. As used herein, a staggered window PDF probability distribution broadly refers to a combined PDF distribution that shares one or more sequential time windows associated with a second combined PDF probability distribution.

As an example, as shown in FIG. 10, the PDF distribution 1024 of interrelated event features associated with time window '1' 1004 is contained in scoring container '1' 1064. However, the PDF distribution 1024 contained in scoring container '1' 1060 provides insufficient data for trend analysis of certain features occurring within staggered window SW '1' 1066 as it has no preceding time window. Instead, it is simply based upon the "naïve" PDF distribution 1044 for time window '1' 1004. However, the PDF distribution stored in scoring container '1' 1060 can be used as a reference for trend analysis of certain features occurring within time window '2' 1006.

To continue the example, the combined PDF distribution for staggered window SW '2' 1066 is based upon the sum of PDF distributions 1024, 1026, respectively stored in scoring containers '1' 1062 and '2' 1064, which in turn respectively correspond to time windows '1' 1004 and '2' 1006. Consequently, the combined PDF distribution for staggered window SW '2' 1070 provides sufficient data for trend analysis of certain features occurring within staggered window SW '3' 1070. Accordingly, the combined PDF distribution for staggered window SW '3' 1070 is based upon processing the PDF distributions 1026, 1028, respectively stored in scoring containers '2' 1064 and '3' 1068, which in turn respectively correspond to time windows '2' 1006 and '3' 1008.

As before, the combined PDF distribution for staggered window SW '3' 1070 provides sufficient data for trend analysis of certain features occurring within staggered window SW '4' 1074. Accordingly, the combined PDF distribution for staggered window SW '4' 1074 is based upon processing the PDF distributions 1028, 1030 respectively stored in scoring containers '3' 1068 and '4' 1072, which in turn respectively correspond to time windows '3' 1008 and '4' 1010. The process in continued to generate a combined PDF distribution for staggered window SW '5' 1076 by processing the PDF distributions 1030, 1032, respectively stored in scoring containers '4' 1072 and '5' (not shown), which in turn respectively correspond to time windows '4' 1010 and '5' 1012.

In certain embodiments, the probability distributions corresponding to time windows '1' 1004 through '5' 1012 may be implemented as cumulative distribution function (CDF) distributions (not shown), In certain embodiments, the CDF distributions may be generated through the use of t-Digest, described in greater detail herein. Certain embodiments of the invention reflect an appreciation the t-Digest is efficient in its use of memory and storage, supports merging, and provides high resolution toward the extremes of the probability distribution. The space efficiency and ability to update t-digests quickly, allowing the maintenance of multiple probability distributions across overlapping, staggered time windows. As an example, the probability of an email containing an attachment with greater than "x" bytes can be tracked over a one-week window, staggering those one-week windows every hour. From the foregoing, those of skill in the art will recognize that inferred cumulative probability distributions will change over time as the underlying probability distributions change.

Figure 11:
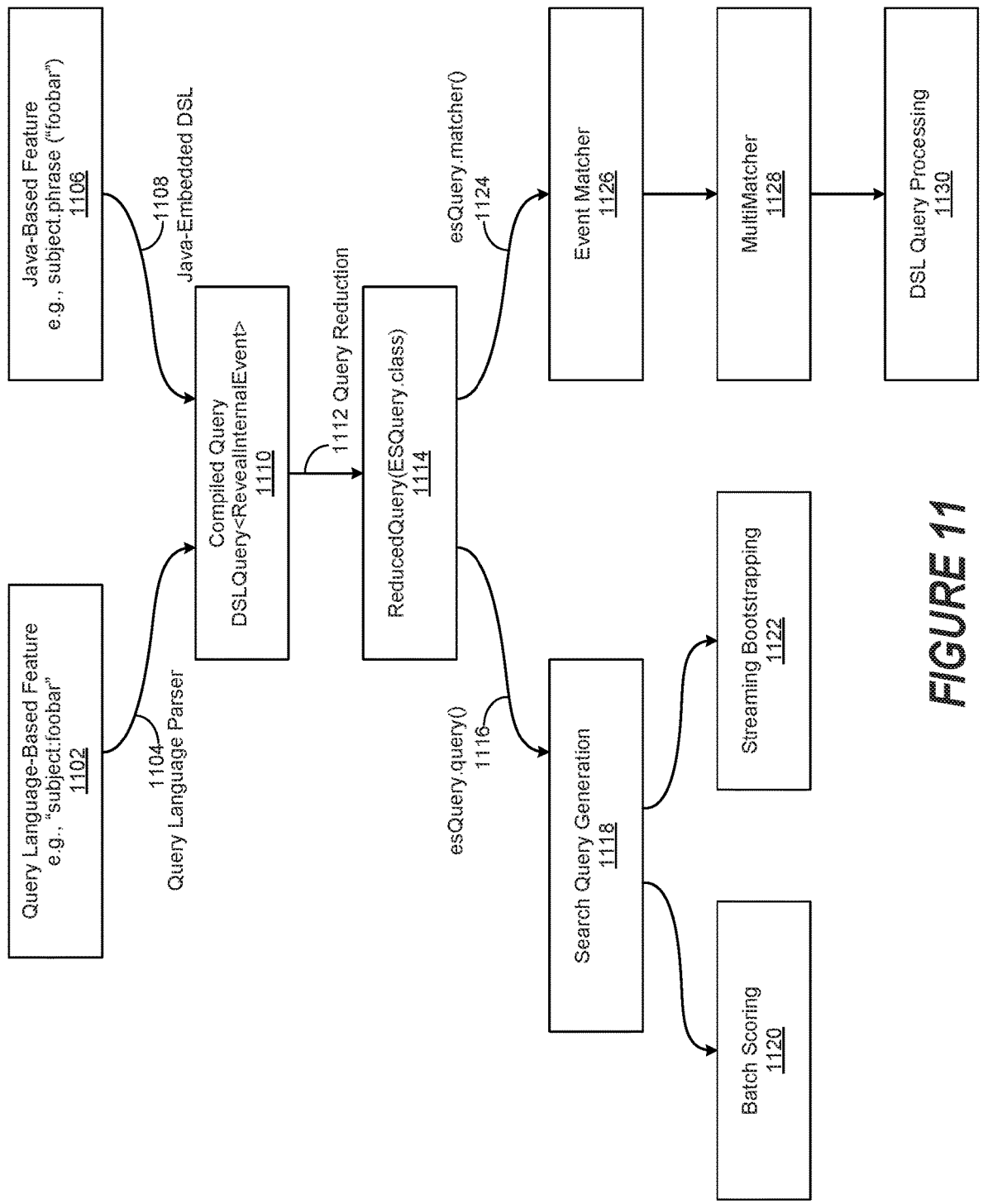
FIG. 11 is a generalized process flow diagram of the performance of data search and feature matching operations associated with the compilation of a query.

FIG. 11 is a generalized process flow diagram of the performance of data search and feature matching operations associated with the compilation of a query implemented in accordance with an embodiment of the invention. In certain embodiments, a query language parser 1104, familiar to those of skill in the art, may be used to perform feature matching operations associated with a query. For example, as shown in FIG. 11, a query language parser 1104 may be used to identify 1102 a query language-based feature (e.g., "subject:foobar") in various data associated with an event. In certain embodiments, a Domain-Specific Language (DSL), likewise described in greater detail herein, may be used to perform feature matching operations associated with a query. For example, as likewise shown in FIG. 11, a Java-embedded DSL 1108 may be used to identify 1106 a Java-based feature (e.g., subject.phrase "foobar") in various data associated with an event. In certain embodiments, the resulting feature may be used to generate a compiled query 1110. In certain embodiments, the compiled query 1110 may be implemented as a DSL Query (e.g., DSLQuery<RevealInternalEvent>).

In certain embodiments, query reduction 1112 operations may be performed on the resulting compiled query 1110. In certain embodiments, the query reduction operations 1112 may be implemented to reduce the compiled query to a class 1114 of queries (e.g., ReducedQuery(ESQuery.class). In certain embodiments, the resulting class 1116 of queries, (e.g., esQuery.query( )), may be used in the performance of search query generation 1118. In certain embodiments, the resulting class 1116 of queries may be implemented to query a persistent datastore of event data. In certain embodiments, the results of the search query generation 1118 may be used to perform batch scoring 1120 operations, streaming bootstrapping 122 operations, of a combination thereof.

In certain embodiments, the resulting class of queries 1124 (e.g., esQuery.matcher( )) may be used in the performance of various matching operations, described in greater details herein. In certain embodiments, the resulting class of queries 1124 may be implemented to perform the query in-memory or in-process. In certain embodiments, the matching operations (e.g., Matcher<RevealInternalEvent>) may be performed by a discrete event matcher 1126. As used herein, a discrete feature broadly, refers to an individual feature, described in greater detail herein, associated with an event, likewise described in greater detail herein. In certain embodiments, a discrete feature matcher may be implemented to process various data associated with an event to identify a matching, discrete feature in an associated compiled query 1110.

In certain embodiments, a multimatcher 1128 may be implemented to use the results of the matching operations performed by the discrete event matcher 1126 to perform concurrent matching operations associated with multiple discrete features. In certain embodiments, a DSL query processing 1130 operations may be implemented to use the results of the matching operations performed by a discrete event matcher 1126, associated with the multimatcher 1128 to perform a DSL query, likewise described in greater detail herein. In certain embodiments, the multimatcher 1128 may be associated with two or more event matchers 1126, each of which may be respectively implemented to perform individual event matching operations. In certain embodiments, a DSL query processing 702 module, described in the descriptive text associated with FIG. 7, may be implemented to perform the DSL query processing operations.

Certain embodiments of the invention reflect an appreciation a predicate of a query may refer to all manner of things, such as which entities may be associated with a particular event, what their respective roles may be, values or ranges for metadata, and so forth. Other examples of such query predicates include the content of the subject field and body of an email, as well as text extracted from an associated attachment. Certain embodiments of the invention likewise reflect an appreciation that queries of such predicates may involve interpreting their respective string values in various ways according to the syntax of their associated DSL.

In certain embodiments, such an interpretation may include an exact match of a specified whole value. In certain embodiments, such an interpretation may include a match on a sub-phrase, subject to lexical analysis. For example, the sub-phrase "hello world" matching a portion of the string "I say hello, world, to everyone." In certain embodiments, such an interpretation may include a match on a sub-phrase that is not zoned. As an example, the target string may include a disclaimer attached to, or text quoted within, an email thread. In certain embodiments, such an interpretation may include a proximity search, such as searching for terms in a lexically-analyzed input stream that are proximate to one another with possible intervening terms. In certain embodiments, such an interpretation may include the use of wildcard matches (e.g., or "?"), or fuzzy matches, such as terms matching within a certain Levenshtein distance.

Certain embodiments of the invention reflect an appreciation that the implementation of lexical analysis may require significant resources. As an example, a target body of text containing 10,000 tokens may be processed with 1,000 associated queries to identify their matching features. Typical approaches to the performance of such queries with a lexical analyzer may require repeating associated analysis processes for each query. Consequently, a total of 10 million tokens may be processed (i.e., 1,000 queries times 10,000 target tokens). Alternatively, one pass through the 10,000 tokens may be performed, which results in the reification of each token, which may involve many heap allocations. In turn, the resulting tokens may then be iterated repetitiously to perform the queries.

In certain embodiments, a matching algorithm may be implemented to process a target body of text in a single pass to identify matching features contained within a plurality of associated queries. In certain of these embodiments, allocations from the heap are only performed to track actual matches as opposed every token the algorithm examines. Likewise, in certain embodiments, a given kind of lexical analysis is performed on any field once, and then only if doing so is actually required to determine whether the document contains a matching term. As an example, "mode:chat" and "body:{Oversight Words}" would search for any terms from a lexicon called "Oversight Words" in the body of chat messages, but would not lexically analyze the body of any email to look for oversight words as that operation has already been eliminated by the cheaper term mode:chat. Accordingly, for a given target number of queries to match (e.g., hundreds to thousands) an order of magnitude or more speed may be realized using the same hardware than either indexing the document in an in-memory database and then querying against it or matching each query independently.

Figure 12:
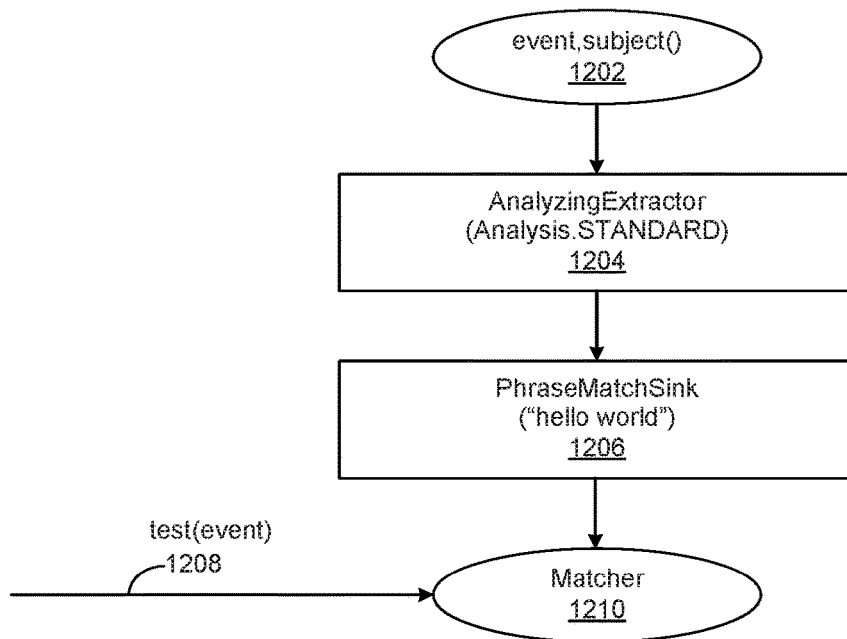
FIG. 12 is a generalized process flow diagram of the performance of lazy matching operations for a single, analyzed query.

FIG. 12 is a generalized process flow diagram of the performance of lazy matching operations for a single, analyzed query implemented in accordance with an embodiment of the invention. As used herein, lazy matching, also commonly referred to as lazy evaluation or call-by-need, broadly refers to an evaluation approach that delays the evaluation of an expression until its value is needed, and which also avoids repeated evaluation (i.e., sharing). In various embodiments, a call (e.g., test(event))1208 may be made to test whether certain features associated with a particular event match a given query (e.g., "hello world").

In these embodiments, a Matcher 1210 for that predicate may not know whether it is a match or not. However, it does know that it is associated with a phrase match sink 1206 (e.g., PhraseMatchSink), which may be looking for the phrase "hello world." Accordingly, it asks the sink 1206 whether it matches. In turn, the sink 1206 may not know either. However, it does know it receives its input (e.g., Analysis.STANDARD) from an analyzing feature extractor 1204 (e.g., AnalyzingExtractor), which in turn knows it has not yet been run. Accordingly, it runs by taking the string from the input field 1202 (e.g., event.subject( )) and performs a lexical analysis. As a result, the original field 1202 is passed through as a result of the lexical analysis performed by the analyzing feature extractor 1204.

Figure 13:
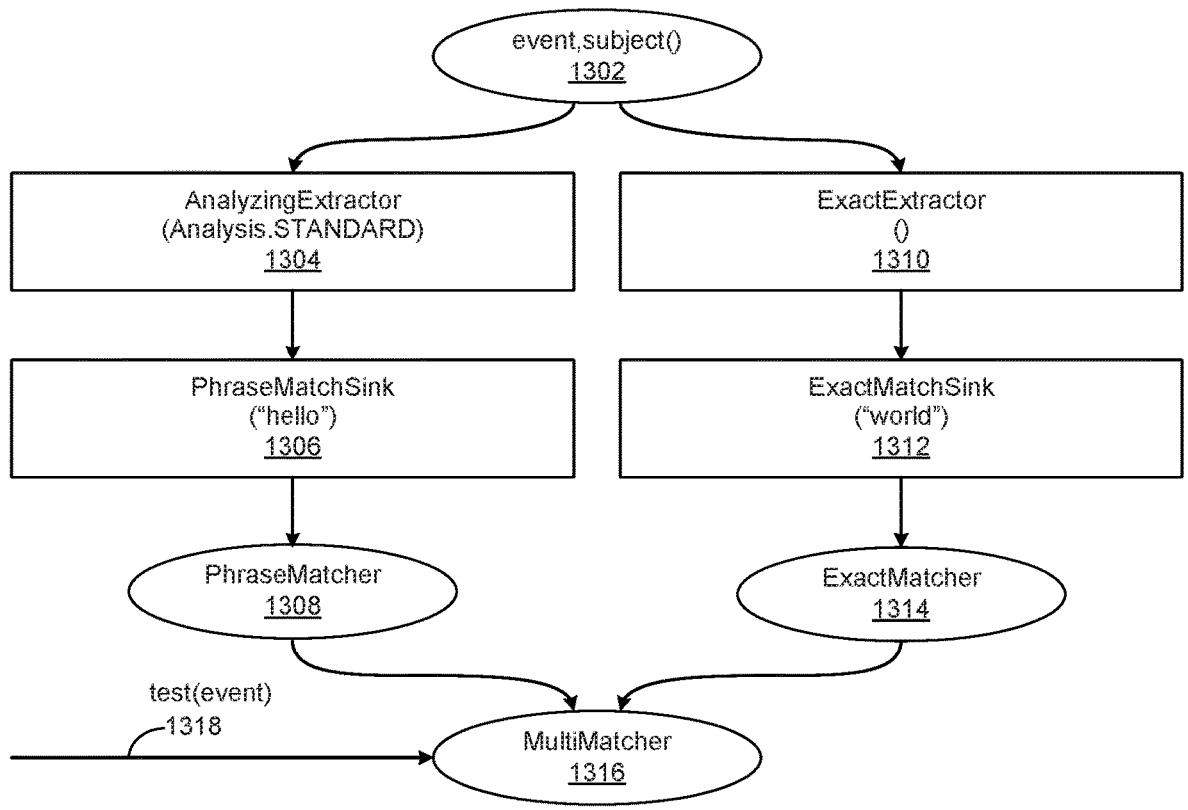
FIG. 13 is a generalized process flow diagram of the performance of lazy matching operations for a mixed analyzed and non-analyzed query.

FIG. 13 is a generalized process flow diagram of the performance of lazy matching operations for a mixed analyzed and non-analyzed query performed in accordance with an embodiment of the invention. In various embodiments, a call (e.g., test(event))1318 may be made to test whether certain features associated with a particular event match a given query (e.g., subject: "hello", subject="world") In certain embodiments, such a query may ask whether any features associated with an event contain the word "hello" after lexical analysis OR exactly match the string "world."

Referring now to FIG. 13, a MultiMatcher 1316 may be implemented in certain embodiments to receive a call 1318 (e.g., test(event)) to test whether an event matches. In certain embodiments, the MultiMatcher 1316 may be implemented to perform multi match operations, which as used herein, broadly refers to coordinating the use of two or more matchers, such as a PhraseMatcher 1308 or an ExactMatcher 1314, to perform two or more matching operations associated with a single query. For example, a MultiMatcher 1316 for a particular predicate may not know whether it is a match or not. Yet it may know it is the "OR" of one of two other matchers, PhraseMatcher 1308, which is associated with a phrase match sink 1306 (e.g., PhraseMatchSink), which in turn may be looking for the phrase "hello," and ExactMatcher 1314, which is likewise associated with an exact match sink 1312 (e.g., ExactMatchSink), that in turn may be looking for the exact phrase "world."

In certain embodiments, the MultiMatcher 1316 may start with the ExactMatcher 1314, as it is associated with an exact feature extractor 1308 (e.g., ExactExtractor( )), which has lower processing cost metric. Accordingly, the ExactMatcher 1314 asks the exact match sink 1312, which in turn asks its associated exact feature extractor 1318 for the value "world." As a result, the original field 1302 (e.g., event.subject( )) is passed through without any lexical analysis.

If there is a match, then the MultiMatcher 1316 knows its "OR" has been satisfied. Otherwise, the MultiMatcher 1316 asks the PhraseMatcher 1308, which in turn asks the phrase match sink 1306. In turn, the phrase match sink 1306 asks its associated analyzing feature extractor 1304 (e.g., AnalyzingExtractor (Analysis.STANDARD)) for the value "hello." As a result, the original field 1302 (e.g., event.subject( )) is passed through as a result of the lexical analysis performed by the analyzing feature extractor 1304.

Figure 14:
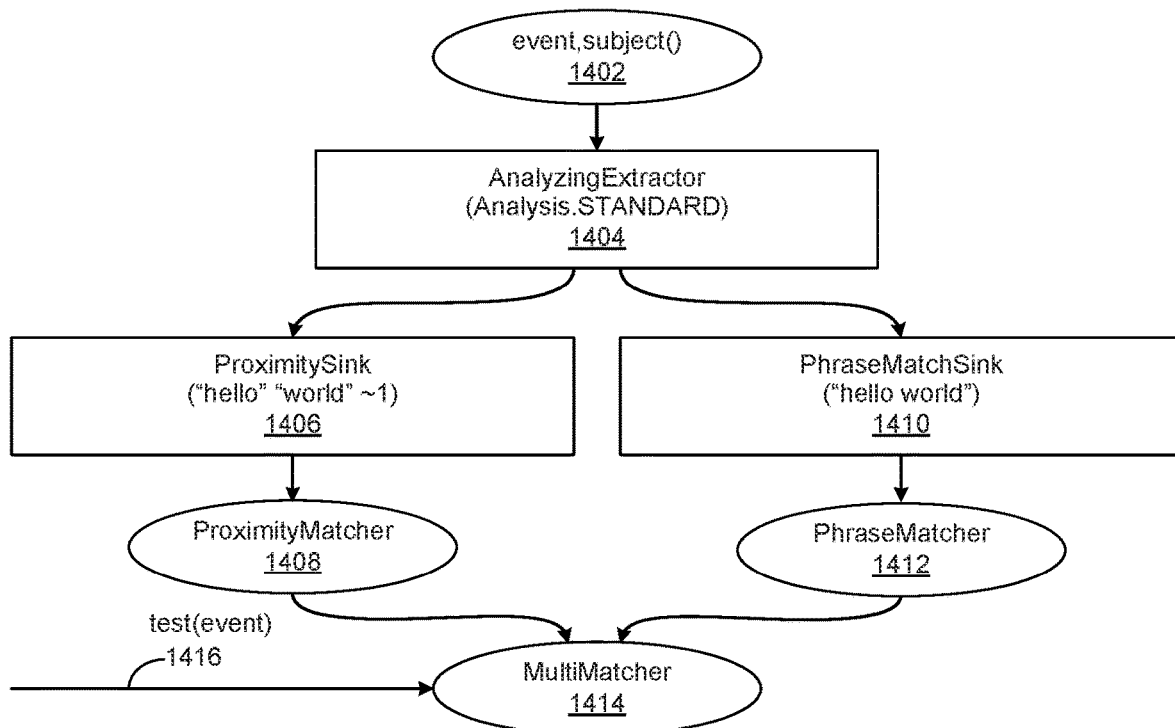
FIG. 14 is a generalized process flow diagram of the performance of lazy matching operations based upon a shared extractor.

FIG. 14 is a generalized process flow diagram of the performance of lazy, matching operations based upon a shared extractor implemented in accordance with an embodiment of the invention. In various embodiments, a call 1416 (e.g., test(event)) may be made to test whether certain features associated with a particular event match a given query based upon an analyzed version of the field. In certain embodiments, the terms defining a feature may not be contiguous to one another. Instead, they may have one or more intervening "slop" terms separating them (e.g., subject: ("hello" "world" ~1). As an example, the features may contain the phrase "hello beautiful world." In certain embodiments, the terms defining a feature may be contiguous (e.g., subject: "hello world"). Accordingly, the contiguous features may not have the identical sequence of terms in a given query.

Referring now to FIG. 14, a call 1416 (e.g., test(event)) may be made to test whether the event matches. However, the MultiMatcher 1414 for that predicate may not know whether it is a match or not. Yet it may know it is the "OR" of one of two other matchers, ProximityMatcher 1408, which is associated with a proximity sink 1406 (e.g., ProximitySink), which in turn may be looking for phrases that include the features "hello" and "world" that are proximate to one another, and PhraseMatcher 1412, which is likewise associated with a phrase match sink 1410 (e.g., PhraseMatchSink) that in turn may be looking for the identical sequence of terms in the phrase "hello world."

Accordingly, the MultiMatcher 1412 may first elect to use ProximityMatcher 1408. Certain embodiments of the invention reflect an appreciation that either the ProximityMatcher 1408 or the PhraseMatcher 1412 may be chosen first, as they are both associated with an analyzing extractor 1404 (e.g., AnalyzingExtractor (Analysis.STANDARD)). Consequently, there an insubstantial difference in their respective processing costs.

Once the MultiMatcher 1412 selects the ProximityMatcher 1408, it in turn asks a proximity sink 1406 (e.g., ProximitySink), which in turn asks the analyzing extractor 1404 for the value ("hello" "world"~1). As a result, the analyzing extractor 1404 lexically analyzes the value of the field in the event 1402, followed by the analyzing extractor 1404 pushing its token stream to both the proximity sink 1406 and the phrase match sink 1408. If the proximity match sink 1406 is not a match, then the PhraseMatcher 1412 asks the phrase match sink 1408 whether it matched.

However, this operation does not result in the invocation of AnalyzingExtractor 1404 as it has already run, and its dependent proximity sink 1406 and phrase match sink 1408 have memorized the results. As used herein, memoizing broadly, refers to known optimization approaches commonly used to increase the processing speed of computer programs by storing the results of expensive function calls in a cache and returning the cached result when the same inputs occur again. Thereafter, the ProximityMatcher 1408 provides a final result by passing the original field 1402 (e.g., event.subject( )) through as a result of the lexical analysis performed by the analyzing extractor 1404.

Figure 15:
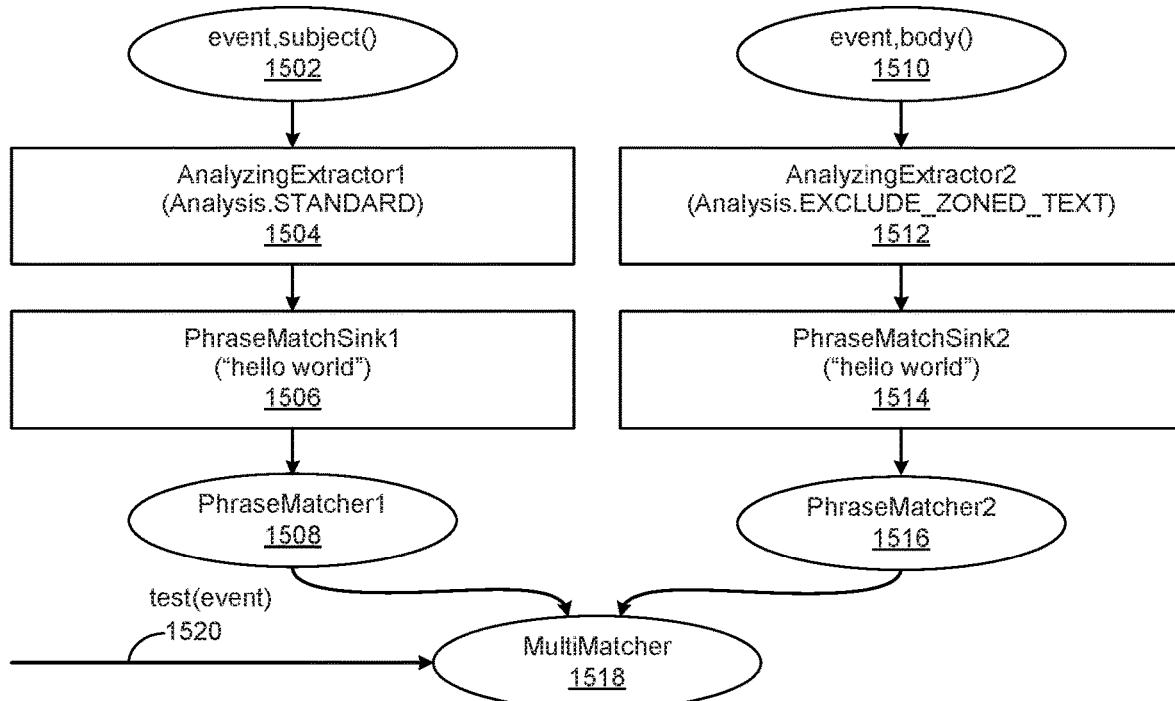
FIG. 15 is a generalized process flow diagram of the performance of lazy, matching operations performed with different lexical analyzers.

FIG. 15 is a generalized process flow diagram of the performance of lazy matching operations performed with different lexical analyzers implemented in accordance with an embodiment of the invention. In various embodiments, a call 1520 (e.g., test(event)) may be made to test whether certain features associated with a particular event match a given query based upon an analyzed version of the field. In certain embodiments, the features contained may not share the same classification. As an example, features associated with an email event may have various classifications, such as "subject line," "body," "attachment," and so forth. To continue the example, a query may contain the features "hello world," which may reside in an email's subject line (e.g., subject: "hello world") "OR" its body (body:"hello world").

Referring now to FIG. 15, a call 1520 (e.g., test(event)) may be made to test whether the event matches. However, the MultiMatcher 1518 for that predicate may not know whether it is a match or not. Yet it may know it is the "OR" of one of two other matchers, PhraseMatcher1 1408, which is associated with a phrase match sink '1' 1506 (e.g., PhraseMatchSink1), which in turn may be looking for phrases that include the features "hello world" in the subject line of an email, and PhraseMatcher2 1516, which is likewise associated with a phrase match sink '2' 1514 (e.g., PhraseMatchSink2) that in turn may be looking for the phrase "hello world" in the body of an email.

Accordingly, the MultiMatcher 1516 may first elect to use PhraseMatcher1 1408. Certain embodiments of the invention reflect an appreciation that the PhraseMatcher1 1508, associated with an analyzing extractor '1' 1504 (e.g., AnalyzingExtractor1 (Analysis.STANDARD)), may be chosen first, as the subject line of an email is typically shorter than its body. Consequently, its processing costs may be less than selecting PhraseMatcher2 1516, which is associated with analyzing extractor '2' 1504 (e.g., AnalyzingExtractor2 (Analysis.EXCLUDE_ZONED_TEXT)).

Once the MultiMatcher 1518 selects the PhraseMatcher1 1508, it in turn asks the phrase match sink '1' 1506 (e.g., PhraseMatchSink1), which in turn asks the analyzing extractor '1' 1504 for the value ("hello world"). If a match is found in the subject line of the email, then the PhraseMatcher1 1508 provides a final result by passing the original field 1502 (e.g., event.subject( )) through as a result of the lexical analysis performed by the analyzing extractor '1' 1504. However, if no match is found, then phrase match sink '2' 1514 is invoked by the PhraseMatcher2 1514, which causes the analyzing extractor '2' 1512 to perform lexical analysis on the larger field of the email body 1510, excluding zoned text such as disclaimers, boilerplate, repetitive text, and so forth. If a match is found in the body of the email, then the PhraseMatcher2 1516 provides a final result by passing the original field 1510 (e.g., event.body ( )) through as a result of the lexical analysis performed by the analyzing extractor '2' 1512.

Figure 16:
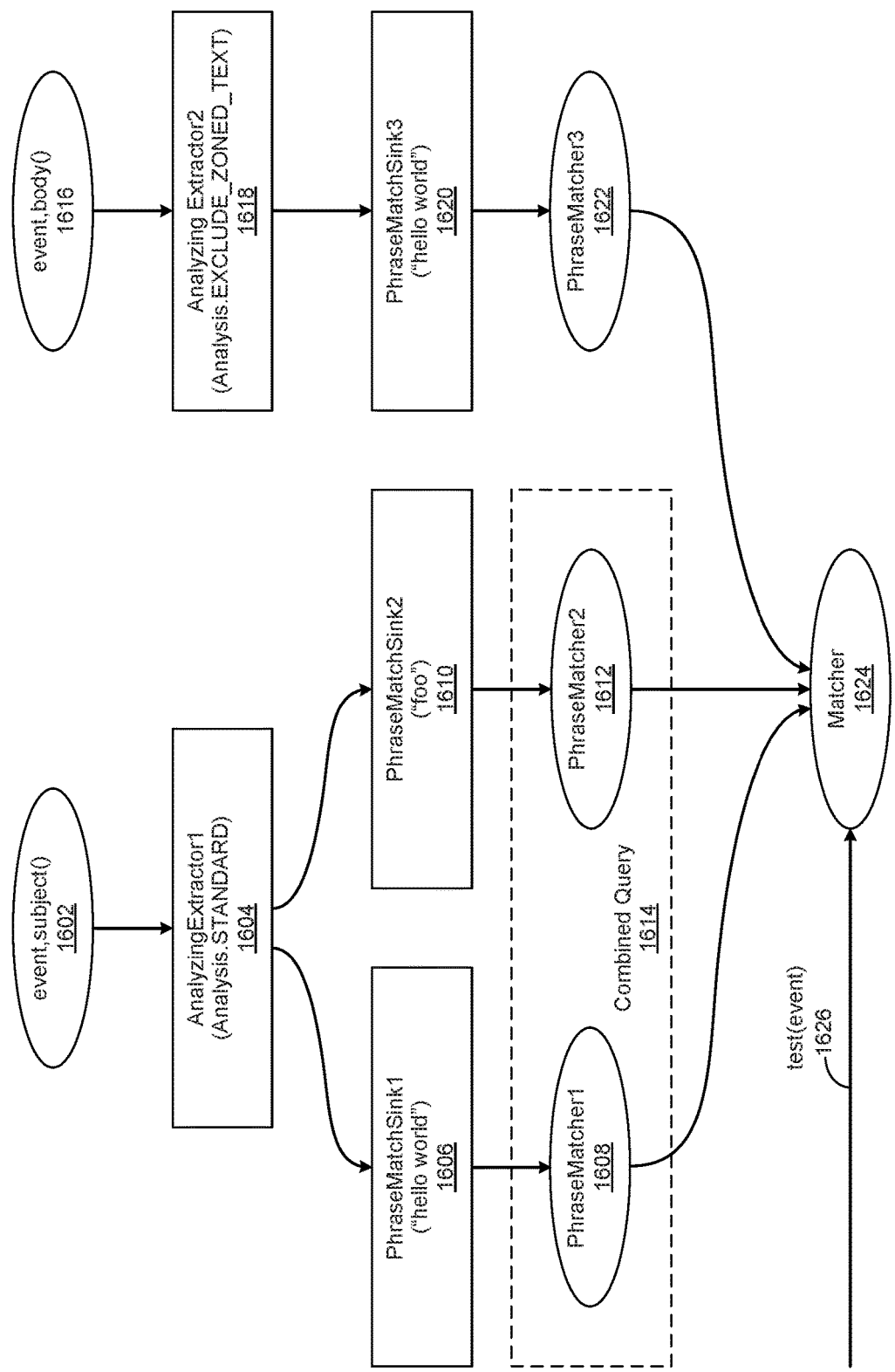
FIG. 16 is a generalized process flow diagram of the performance of lazy matching operations with reuse across queries.

FIG. 16 is a generalized process flow diagram of the performance of lazy matching operations with reuse across queries implemented in accordance with an embodiment of the invention. In various embodiments, a call 1626 (e.g., test(event)) may be made to test whether certain features associated with a particular event match a given query based upon an analyzed version of the field. In certain embodiments, the features contained may not share the same classification. As an example, features associated with an email event may have various classifications, such as "subject line," "body," "attachment," and so forth. To continue the example, a query may contain the features "hello world" "OR" "foo," either of which may reside in an email's subject line (e.g., subject: "hello world", subject:"foo"), "OR" the feature "hello world" may reside in its body (e.g., body: "hello world").

Referring now to FIG. 16, a call 1626 (e.g., test(event)) may be made to test whether the event matches. However, the Matcher 1624 for that predicate may not know whether it is a match or not. Yet it may know it is the "OR" of one of three other matchers, PhraseMatcher1 1608, PhraseMatcher2 1702, and PhraseMatcher3 1622. As shown in FIG. 16, PhraseMatcher1 1608 is associated with phrase match sink '1' 1506 (e.g., PhraseMatchSink1), which in turn may be looking for phrases that include the features "hello world" in the subject line of an email. Likewise, PhraseMatcher2 1702, which is associated with phrase match sink '2' 1610 (e.g., PhraseMatchSink2), in turn may be looking for the phrase "foo" in the subject line of an email as well. As likewise shown in FIG. 16, PhraseMatcher3 16226, which is associated with phrase match sink '3' 1514 (e.g., PhraseMatchSink3), in turn may be looking for the phrase "hello world" in the body of an email.

Accordingly, the Matcher 1624 may first elect to use PhraseMatcher1 1608 or PhraseMatcher2, both of which are associated with an analyzing extractor '1' 1604 (e.g., AnalyzingExtractor1. (Analysis.STANDARD)), as the subject line of an email is typically shorter than its body. Consequently, its processing costs may be less than selecting PhraseMatcher3 1516, which is associated with analyzing extractor '2' 1618 (e.g., AnalyzingExtractor2 (Analysis.EXCLUDE_ZONED_TEXT)). Once the Matcher 1624 selects the PhraseMatcher1 1608, it in turn asks the phrase match sink '1' 1606 (e.g., PhraseMatchSink1), which in turn asks the analyzing extractor '1' 1604 for the value ("hello world"). If a match is found in the subject line of the email, then the PhraseMatcher1 1608 provides a final result by passing the original field 1602 (e.g., event.subject ( )) through as a result of the lexical analysis performed by the analyzing extractor '1' 1604.

However, if no match is found, then the PhraseMatcher 1702 asks the phrase match sink 1610 for the value "foo." if a match is found in the subject line of the email, then the PhraseMatcher2 1702 provides a final result by passing the original field 1602 (e.g., event.subject ( )) through as a result of the lexical analysis performed by the analyzing extractor '1' 1604, as before. However, if no match is found, then phrase match sink '3' 1620 is invoked by the PhraseMatcher3 1622, which causes the analyzing extractor '2' 1618 to perform lexical analysis on the larger field of the email body 1616, excluding zoned text such as disclaimers, boilerplate, repetitive text, and so forth. If a match is found in the body of the email, then the PhraseMatcher3 1622 provides a final result by passing the original field 1616 (e.g., event.body ( )) through as a result of the lexical analysis performed by the analyzing extractor '2' 1618.

In certain embodiments, two matchers, such as PhraseMatcher1 1608 and PhraseMatcher2 1702, that are associated with the same extractor (e.g., AnalyzingExtractor1 (Analysis.STANDARD)) may be implemented such that they result in a combined query 1614. In certain embodiments, such multiple, or combined, queries may be compiled together such that they can share intermediate results. Consequently, when a second matcher (e.g., PhraseMatcher2 1702) is tested, a corresponding sink (e.g., phrase match sink '2' 1610) can provide it with a result without additional processing. In certain embodiments, a Matcher 1624 may be implemented to sequentially call a test(event) 1626 for each of its associated matchers (e.g., PhraseMatcher1 1608, PhraseMatcher2 1702, and PhraseMatcher3 1622) and return all results as a table of Boolean values keyed by a unique ID corresponding to the query each matcher was compiled from.

Figure 17A:
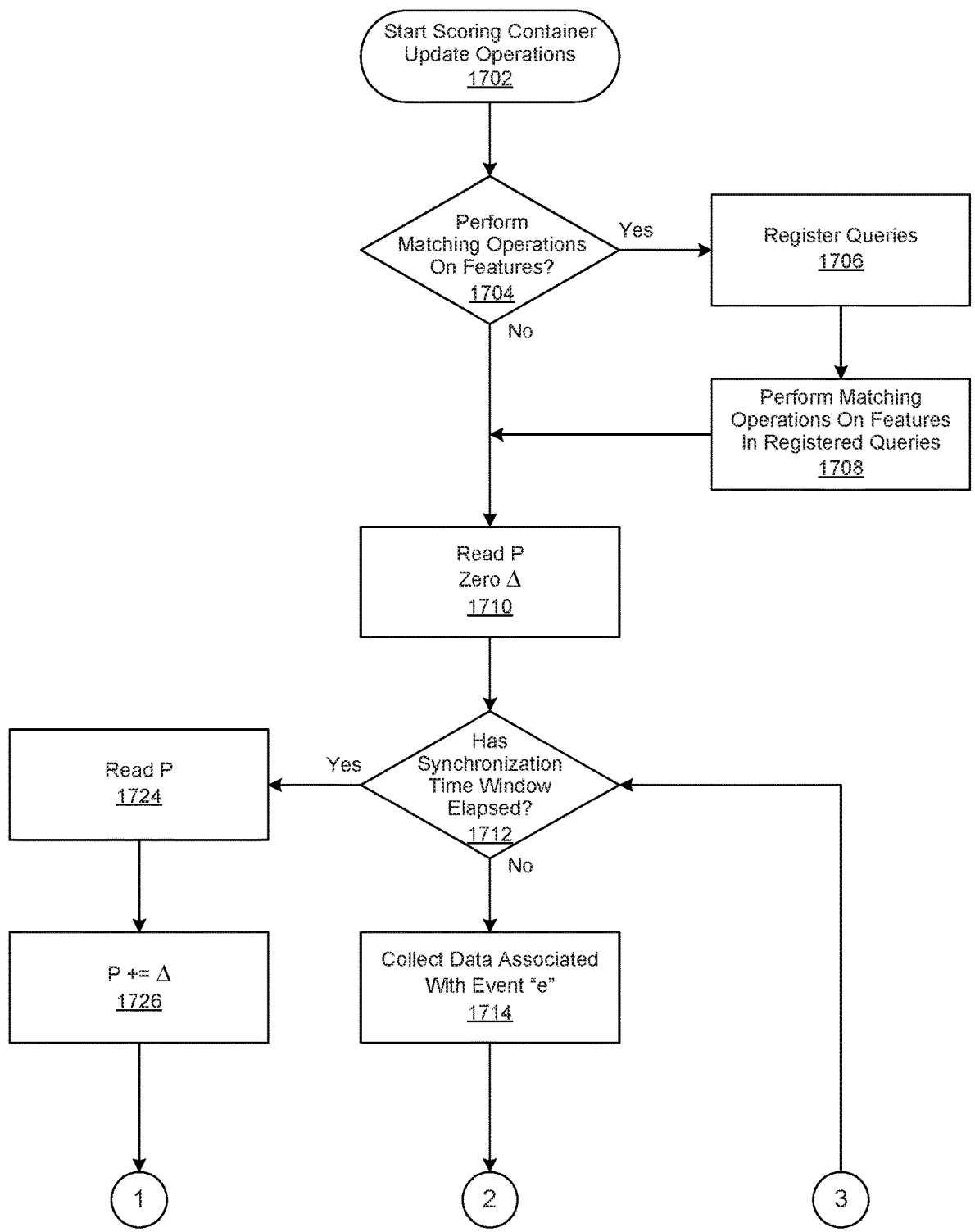
FIGS. 17a and 17b are a generalized flowchart of the performance of scoring container update operations.
Figure 17B:
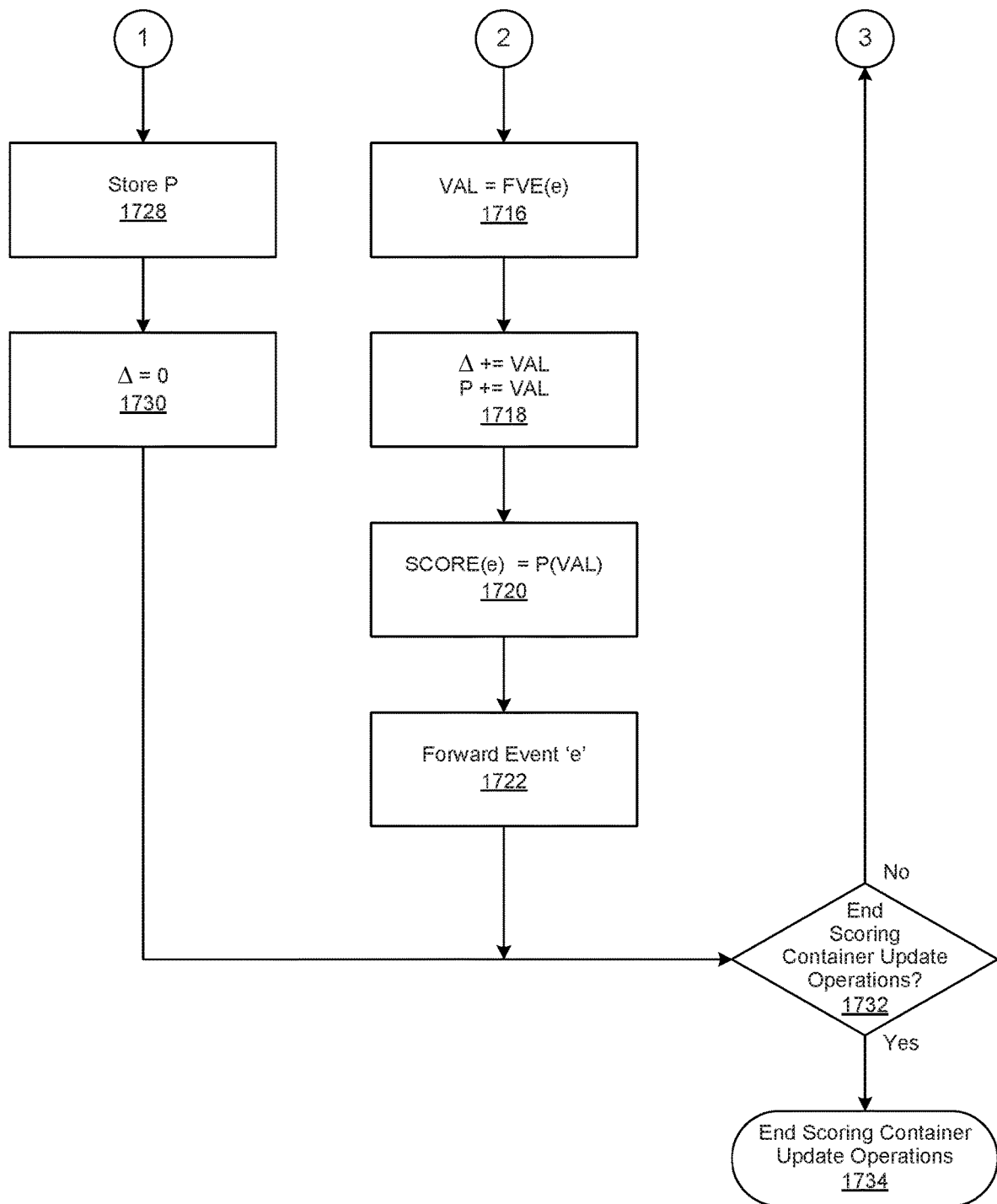

FIGS. 17a and 17b are a generalized flowchart of the performance of scoring container update operations implemented in accordance with an embodiment of the invention. In this embodiment, scoring container update operations are begun in step 1702, followed by a determination being made in step 1704 whether to perform matching operations on features, as described in greater detail herein. If so, the queries are registered in step 1706, as likewise described in greater detail herein, followed by the performance of matching operation on features within registered queries in step 1708. Thereafter, or if it was decided in step 1704 to not perform matching operations, the current value 'P' of a percentile scoring container is read, and the value of a corresponding delta scoring container is set to zero, in step 1710.

A determination is then made in step 1712 whether a synchronization time window has elapsed. If not, then various data associated with event 'e' is collected in step 1714, followed by setting the value of the data corresponding to the observed event as VAL=FVE(e) in step 1716. The resulting VAL associated with the data corresponding to the observed event is then added to the current value stored in the percentile and delta scoring containers. Thereafter, the score associated with the event is calculated in step 1720 as SCORE(e)=P(VAL), followed by forwarding data associated with event 'e' to a persistent datastore in step 1722.

However, if it was determined in step 1712 that a synchronizing time window has elapsed, then the value 'P for the percentile scoring container is read in step 1724, followed by the addition in step 1726 of the values currently stored in the delta scoring container. The resulting value 'P' of the percentile scoring container is then stored in step 1728, followed by setting the value of the delta scoring container to zero in step 1730. Thereafter, or after event 'e' has been forwarded in step 1722, a determination is made in step 1732 whether to end scoring container update operations. If not, the process is continued, proceeding with step 1712. Otherwise, scoring container update operations are ended in step 1734.

Figure 18:
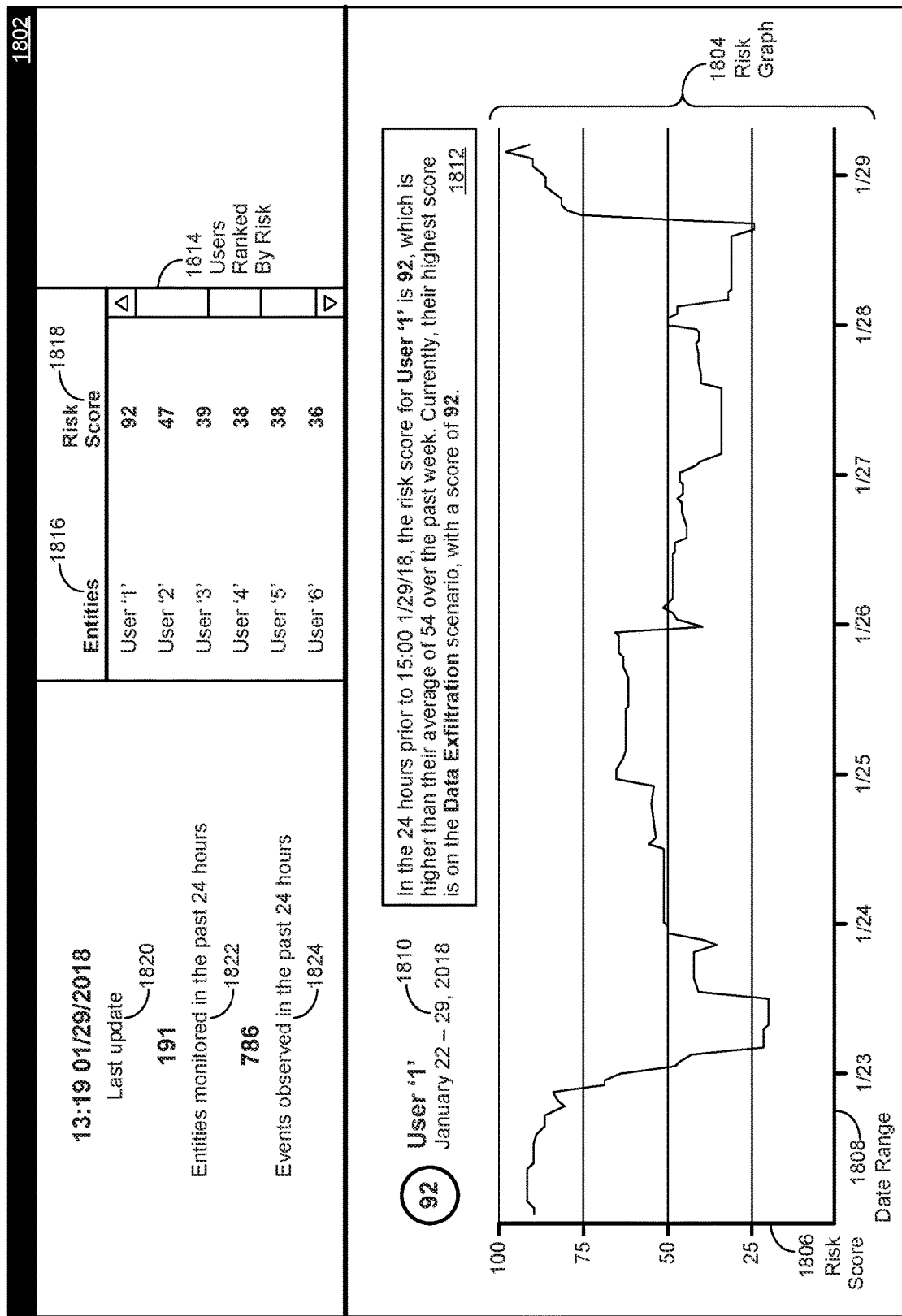
FIG. 18 shows the operation of a probability distribution analysis system displayed within a user interface.

FIG. 18 shows the operation of a probability distribution analysis system displayed within a user interface implemented in accordance with an embodiment of the invention. In this embodiment, the risk graph 1804 displayed within a user interface (UI) window 1802 depicts the fluctuation of risk scores 1806 at different points in time within a particular date range 1808. In certain embodiments, the fluctuation of risk scores 1806 displayed within the risk graph 1804 corresponds to the potential risk associated with a particular user 1810 at various points in time within the date range 1808. In certain embodiments, a risk details window 1812 corresponding to the user 1810 may be displayed within the UI window 1802.

In certain embodiments, summary information may likewise be displayed within the UI window 1802. For example, as shown in FIG. 18, the last update 1820 of the risk graph 1804, the number of entities 1822 monitored in the last 24 hours, and the number of events 1824 observed in the last 24 hours may be displayed. In certain embodiments, individual entities 1816 being monitored, and their associated risk scores 1818, may be displayed in ranked order 1814 by their corresponding risk scores within the UI window 1802.

As will be appreciated by one skilled in the art, the present invention may be embodied as a method, system; or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM); an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a feature generation operation, comprising:
   receiving a stream of data via a protected endpoint, the stream of data representing electronically-observable interactions by a user, the protected endpoint identifying a plurality of events from the interactions by the user;
   applying labels to applicable events from the plurality of events, the applying labels providing a labeled events, the applying labels to applicable events facilitating identification of certain interrelated events from the plurality of events;
   processing the labeled events to extract a feature from respective labeled events, the feature being associated with an event, the feature referring to a property, characteristic or attribute of the event;
   analyzing the feature associated with the event;
   generating a feature score for the feature associated with the event, the feature score being generated based upon a scoring container update operation, the scoring container update operation using a scoring container, the scoring container comprising a container implemented to provide an approximation of a probability distribution over the values the scoring container contains, based upon samples from the probability distribution;
   generating a risk score for the user based on the analyzing; and,
   performing a risk assessment operation via a security analytics system based on the feature associated with the event and the risk score.

2. The method of claim 1, wherein:
the applying labels to the applicable events from the plurality of events classifies the applicable events from the plurality of events with associated metadata.

3. The method of claim 1, wherein:
extracting features comprises performing transformation operations on certain features associated with an event to generate a smaller set of derived features.

4. The method of claim 3, wherein:
the smaller set of derived features facilitates determination of a distribution of associated features corresponding to a particular event.

5. The method of claim 1, wherein:
the feature associated with the event comprises at least one of a number of bytes uploaded, a time of day, a presence of certain terms in unstructured content, respective domains associated with senders and recipients of information, and a Uniform Resource Locator (URL) classification of a web page visit.

6. The method of claim 1, wherein:
extracting features performs at least one of an exact feature extract operation and a multi match feature extract operation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving a stream of data via a protected endpoint, the stream of data representing electronically-observable interactions by a user, the protected endpoint identifying a plurality of events from the interactions by the user;
   applying labels to applicable events from the plurality of events, the applying labels providing a labeled events, the applying labels to applicable events facilitating identification of certain interrelated events from the plurality of events;
   processing the labeled events to extract a feature from respective labeled events, the feature being associated with an event, the feature referring to a property, characteristic or attribute of the event;
   analyzing the feature associated with the event;
   generating a feature score for the feature associated with the event, the feature score being generated based upon a scoring container update operation, the scoring container update operation using a scoring container, the scoring container comprising a container implemented to provide an approximation of a probability distribution over the values the scoring container contains, based upon samples from the probability distribution;
   generating a risk score for the user based on the analyzing; and,
   performing a risk assessment operation via a security analytics system based on the feature associated with the event and the risk score.

8. The system of claim 7, wherein:
the applying labels to the applicable events from the plurality of events classifies the applicable events from the plurality of events with associated metadata.

9. The system of claim 7, wherein:
extracting features comprises performing transformation operations on certain features associated with an event to generate a smaller set of derived features.

10. The system of claim 9, wherein:
the smaller set of derived features facilitates determination of a distribution of associated features corresponding to a particular event.

11. The system of claim 7, wherein:
the feature associated with the event comprises at least one of a number of bytes uploaded, a time of day, a presence of certain terms in unstructured content, respective domains associated with senders and recipients of information, and a Uniform Resource Locator (URL) classification of a web page visit.

12. The system of claim 7, wherein:

extracting features performs at least one of an exact feature extract operation and a multi match feature extract operation.

13. A non-transitory, computer-readable storage medium embodying computer program code, the computer program code comprising computer executable instructions configured for:

receiving a stream of data via a protected endpoint, the stream of data representing electronically-observable interactions by a user, the protected endpoint identifying a plurality of events from the interactions by the user;

applying labels to applicable events from the plurality of events, the applying labels providing a labeled events, the applying labels to applicable events facilitating identification of certain interrelated events from the plurality of events;

processing the labeled events to extract a feature from respective labeled events, the feature being associated with an event, the feature referring to a property, characteristic or attribute of the event;

analyzing the feature associated with the event;

generating a feature score for the feature associated with the event, the feature score being generated based upon a scoring container update operation, the scoring container update operation using a scoring container, the scoring container comprising a container implemented to provide an approximation of a probability distribution over the values the scoring container contains, based upon samples from the probability distribution;

generating a risk score for the user based on the analyzing; and, performing a risk assessment operation via a security analytics system based on the feature associated with the event and the risk score.

14. The non-transitory, computer-readable storage medium of claim 13, wherein:

the applying labels to applicable events from the plurality of events classifies the applicable events from the plurality of events with associated metadata.

15. The non-transitory, computer-readable storage medium of claim 13, wherein:

extracting features comprises performing transformation operations on certain features associated with an event to generate a smaller set of derived features.

16. The non-transitory, computer-readable storage medium of claim 15, wherein:

the smaller set of derived features facilitates determination of a distribution of associated features corresponding to a particular event.

17. The non-transitory, computer-readable storage medium of claim 13, wherein:

the feature associated with the event comprises at least one of a number of bytes uploaded, a time of day, a presence of certain terms in unstructured content, respective domains associated with senders and recipients of information, and a Uniform Resource Locator (URL) classification of a web page visit.

18. The non-transitory, computer-readable storage medium of claim 13, wherein:

extracting features performs at least one of an exact feature extract operation and a multi match feature extract operation.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *